US011390129B1

(12) United States Patent
Edren

(10) Patent No.: US 11,390,129 B1
(45) Date of Patent: Jul. 19, 2022

(54) PNEUMATIC VEHICLE SUSPENSION SYSTEM

(71) Applicant: Zoox, Inc., Foster City, CA (US)

(72) Inventor: Johannes Edren, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 498 days.

(21) Appl. No.: 16/443,528

(22) Filed: Jun. 17, 2019

(51) Int. Cl.
*B60G 17/015* (2006.01)
*B60G 11/27* (2006.01)
*B60G 17/052* (2006.01)
*B60G 17/016* (2006.01)

(52) U.S. Cl.
CPC .......... *B60G 17/0155* (2013.01); *B60G 11/27* (2013.01); *B60G 17/0162* (2013.01); *B60G 17/0523* (2013.01); *B60G 2400/204* (2013.01); *B60G 2400/821* (2013.01)

(58) Field of Classification Search
CPC ................ B60G 17/0155; B60G 11/27; B60G 17/0162; B60G 17/0523; B60G 2400/204; B60G 2400/821
See application file for complete search history.

(56) References Cited

U.S. PATENT DOCUMENTS 3,752,497 A * 8/1973 Enke .................. B60G 17/0152 280/5.509
5,447,332 A * 9/1995 Heyring ............... B60G 17/056 280/124.104
5,562,305 A * 10/1996 Heyring ............... B60G 17/056 280/124.161
5,785,344 A * 7/1998 Vandewal .......... B60G 17/0152 267/64.16
7,210,688 B2 * 5/2007 Kobayashi ........... B60G 17/016 267/186
7,360,777 B2 * 4/2008 Mizuno ................ B60G 17/056 280/124.157
7,637,516 B2 * 12/2009 Mizuno .................. B60G 21/06 280/124.157
8,123,235 B2 * 2/2012 Monk .................... B60G 21/06 280/5.5
9,061,735 B2 * 6/2015 Heyring .................. B63B 27/30
9,150,282 B2 * 10/2015 Heyring .................. B63B 39/04
10,178,863 B2 * 1/2019 Schnaider ............... F15B 11/16
2004/0061292 A1 * 4/2004 Hall ....................... B60G 21/06 280/5.507

(Continued)

*Primary Examiner* — Toan C To
(74) *Attorney, Agent, or Firm* — Lee & Hayes, P.C.

(57) ABSTRACT

A pneumatic suspension system may include, for each wheel of a vehicle, a strut and an adjustment cylinder in fluid communication with the strut. Adjustment cylinders associated with an end of the vehicle may be mechanically coupled while keeping the cylinders isolated pneumatically. A suspension control system can control fluid flow at each of the adjustment cylinders to selectively engage or disengage an anti-roll feature. By allowing fluid flow at the adjustment cylinders, the struts are free to oscillate in response to forces at the associated wheel, e.g., caused by an uneven road. By inhibiting fluid flow at the adjustment cylinders, forces experienced at the struts can be transferred between multiple struts. In some examples, the fluid flow at the adjustment cylinders can be controlled to vary the travel distance of the struts, to selectively provide a stiffer or looser suspension.

19 Claims, 7 Drawing Sheets

SUSPENSION SYSTEM 126
PNEUMATIC SYSTEM 174
SUSPENSION CONTROL SYSTEM 128
VALVE CONTROLLER(S) 150
100 176 178 184 186 168 170 164b 166 164a 188 172 196 190 198 182 180 130a 130b 142 144 140 134 136 138 132 194 192 156 152 154 162 158 160 146 148
114 112 102 120 122 104 124 106 110 108 116 118

(56) References Cited

U.S. PATENT DOCUMENTS

| | | | | |
|---|---|---|---|---|
| 2008/0006494 | A1* | 1/2008 | Vandewal | B60G 17/0152 188/313 |
| 2015/0202939 | A1* | 7/2015 | Stettner | G01S 17/86 701/37 |
| 2017/0313393 | A1* | 11/2017 | Monk | B63B 39/00 |

* cited by examiner

Suspension System 126
Suspension Control System 128
Valve Controller(s) 150
Pneumatic System 174
100
130a
130b

PNEUMATIC VEHICLE SUSPENSION SYSTEM

BACKGROUND

Vehicles may include a suspension system to enhance the comfort of passengers of the vehicle or improve the performance of the vehicle as it travels across uneven surfaces and maneuvers through curves. A suspension system may include assemblies at each wheel of the vehicle including a spring to reduce the force transferred to a chassis of the vehicle as the vehicle travels across a depression or over bump in the surface, and a damper to control oscillations or rebound of the spring as it reacts to the force input. In a passive suspension system, the spring and damper react to the energy transmitted to the spring and damper as the wheel travels across the uneven surface and/or around a turn. In a semi-active or active suspension system, the spring and/or damper may by adjusted to counteract forces from the road and/or resulting from cornering.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
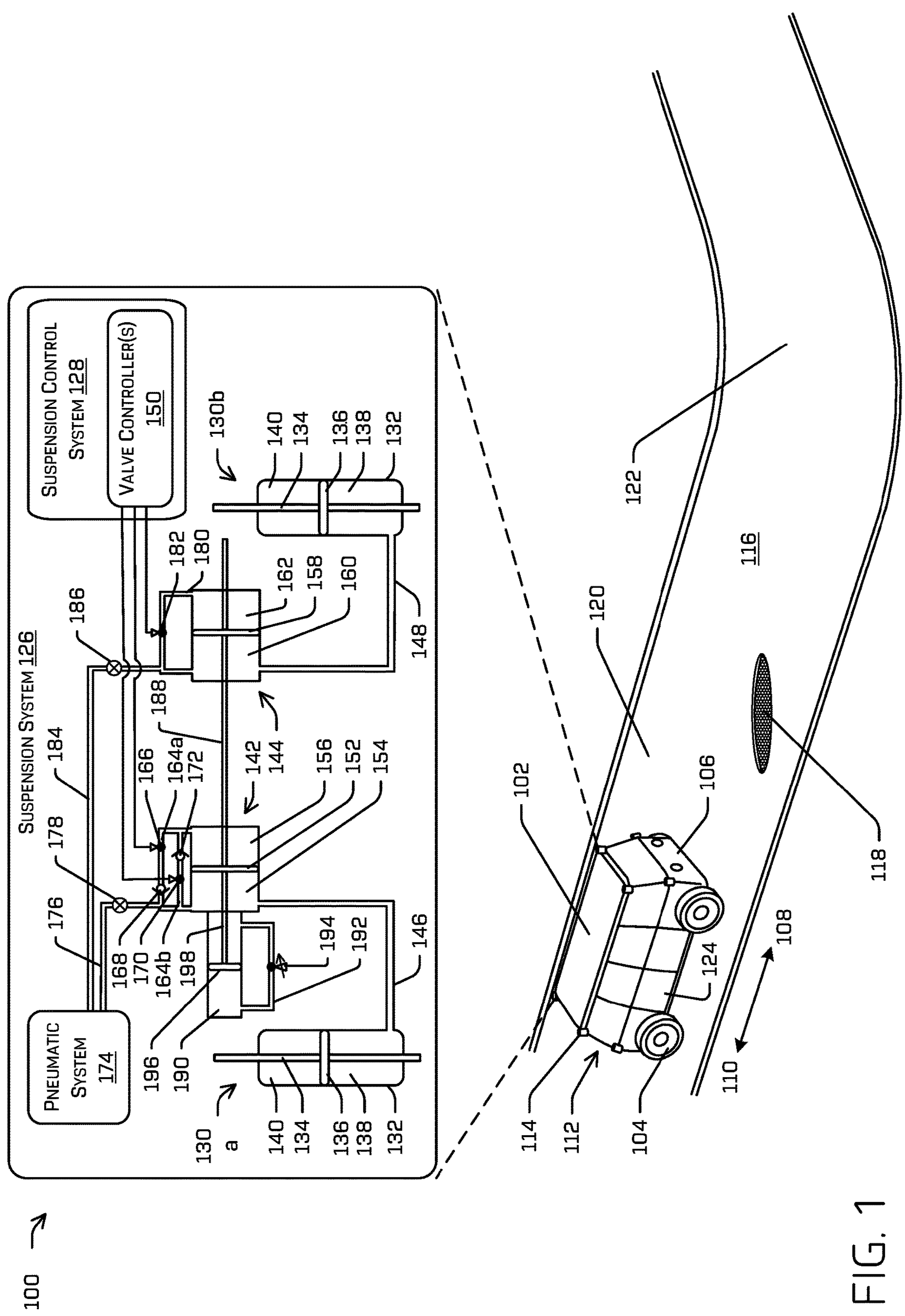
FIG. 1 includes a perspective view of an example vehicle and a schematic depiction of a portion of an example suspension system, according to aspects of this disclosure.

This disclosure is generally directed to a suspension system, components of a suspension system, and related methods. The suspension system generally couples wheels of a vehicle to a chassis of the vehicle, e.g., for controlling movement of the wheels relative to the chassis. In some examples, the suspension system can be configured to cooperate with a pair of wheels, e.g., the two leading wheels or the two trailing wheels on the vehicle. The suspension system can include a pair of struts and a pair of pneumatic cylinders in fluid communication with the struts. Pistons of the two pneumatic cylinders may be coupled, e.g., via a rigid coupling, such that movement of one piston results in a corresponding movement of the other piston. For example, movement of the pistons may be effectuated using valves that control intracylinder airflow, e.g., between opposite sides of the piston. The suspension system may further include a suspension control system configured to control the valves. In some examples, the valves can be controlled to move the pistons, which may be useful to adjust performance characteristics. For example, by reducing a volume of the portions of the cylinders in fluid communication with the struts, a stiffer suspension can be achieved, e.g., with improved performance in roll-type events. Also in examples, the valves can be controlled to allow free flow of air within the cylinders, e.g., by opening the valves air can selectively flow between volumes on opposite sides of a piston. This may provide a looser suspension that may provide improved performance on uneven roads or the like, e.g., in heave conditions. Though described herein with respect to a pneumatic system, the description is not meant to be so limiting. Particularly, similar techniques may be applied with other systems, such as, for example, a hydraulic system or the like.

In more detail, a pneumatic suspension system can be configured to selectively coordinate reactions of two struts located at an end of a vehicle. For example, the struts can include a first strut associated with a first wheel at a leading or trailing end of the vehicle and a second strut associated with a second wheel at the same leading or trailing end of the vehicle. In examples, the pneumatic suspension system can include a first adjustment cylinder generally defining first and second volumes on opposite sides of a piston. A first volume may be in fluid communication with a first of the struts, which may be embodied as an air spring. The first cylinder and the first strut can be charged or pressurized to an operational pressure, which may be selected to pressurize both volumes of the cylinder and to establish a position of a strut piston of the first strut. The position of the strut piston may determine a ride height of a chassis of the vehicle, proximate the first strut. Once charged, the first strut and the first cylinder can comprise a first closed pneumatic system.

The pneumatic system can also include a second adjustment cylinder, similar to the first adjustment cylinder, but in fluid communication with the second strut and associated with a second wheel of the vehicle. For instance, the second adjustment cylinder may generally define first and second volumes on opposite sides of a piston, with the first volume being in fluid communication with the second strut. The second cylinder and the second strut can be charged or pressurized to an operation pressure, which may be selected to pressurize both volumes of the second cylinder and to establish a position of a strut piston in the second strut. The position of the strut piston may determine a ride height of the chassis of the vehicle, proximate the second strut. In examples, the ride height proximate the second strut can be the same as or different from the ride height proximate the first strut. Once charged, the second strut and the second cylinder can comprise a second closed pneumatic system, separate from the first closed pneumatic system.

In examples although the first and second closed pneumatic systems are separated pneumatically, the first and second systems may be mechanically coupled. For instance, the piston of the first adjustment cylinder can be mechanically connected to the piston of the second adjustment cylinder, e.g., via a piston rod or other movable member. In this manner, pressure changes in either of the volumes associated with the first adjustment cylinder or with the second adjustment cylinder can result in a change in volume (e.g., by displacement of the respective piston) in both of the adjustment cylinders.

In some examples, the pneumatic suspension system can also include one or more valves controlling fluid flow (e.g., flow of compressed air) at the first and second adjustment cylinders. In at least one example, the first adjustment cylinder can include one or more (e.g., two) fluid lines connecting the first and second volumes, and each of the lines can include a valve for selectively allowing fluid flow therethrough. In some examples, a first of the fluid lines can include a first one-way valve that allows fluid flow in only a single direction, e.g., from the first volume to the second volume, and a second of the fluid lines can include a second one-way valve that allows fluid flow in a single, opposite direction, e.g., from the second volume to the first volume. The second adjustment cylinder can include a fluid line connecting the first and second volumes, and the fluid line can include a valve, such as a high flow bypass valve.

The pneumatic suspension system can also include a valve controller configured to selectively operate the valves to alter characteristics of the pneumatic suspension system. By way of non-limiting example, when all of the valves are closed, the first volumes of the cylinders, which are in fluid communication with the struts, can limit the amount of travel of the struts, e.g., by resisting movement of the strut pistons. For example, with the valves in the closed positions, the first and second adjustment cylinders provide an anti-roll feature that limits movement of the two struts. More specifically, the mechanical coupling of the two struts, via the piston rod or other rigid connection, can act to offset expansion and compression forces at the first and second wheels, such as during turning.

Also in examples, the stiffness of the anti-roll feature can be adjusted by changing the first volumes. For example, the first one-way valve associated with the first adjustment cylinder can be controlled to selectively allow air flow from the first volume to the second volume, e.g., to decrease the first volume. Such a reduction in the first volume will also result in a reduction in the first volume of the second adjustment cylinder, e.g., as the piston rod moves. In examples, the reduced first volumes will provide a stiffer anti-roll feature, e.g., because movement of the struts is further restricted by the decreased volume. Conversely, increasing the first volumes will provide a looser anti-roll feature. For example, the first volumes can be increased by controlling the second one-way valve, to cause air to flow from the second volume to the first volume.

Also in examples, the valve controller can control the valves to disengage the anti-roll feature. For example, by opening all of the valves associated with the first and second adjustment cylinders, the first and second struts are effectively decoupled, allowing the first and second strut to move relatively independently. Such an arrangement may be beneficial on uneven roads, e.g., in which the first and second wheels may experience different heave-type forces, and/or at relatively lower speeds.

Systems and techniques described herein can improve many benefits. For instance, pneumatic suspension systems described herein can be passive systems, e.g., because once charged they may not require additional charging and/or active actuators. Accordingly, power requirements of the system may be greatly reduced relative to conventional active suspension systems. However, because the pneumatic suspension systems described herein can be configured, e.g., via the valve controller, a passenger experience, including safety outcomes, can be improved. For example, techniques described herein can engage the anti-roll feature in pitch-type situations, e.g., cornering, and/or in safety-critical situations, e.g., sharp deceleration, in which a rigid suspension may be more desirable. Techniques can also disengage the anti-roll feature in other situations, e.g., on uneven roads that may impart heave-type forces on one or both of the wheels. The systems and techniques can also be readily integrated into existing vehicles. For example, many vehicles, including trucks and buses, have pneumatic brakes and/or suspension features and thus may already include a compressed air source that could charge the systems described herein. Other features and benefits are also apparent from the following description.

The techniques and systems described herein may be implemented in a number of ways. Example implementations are provided below with reference to the figures.

FIG. 1 shows an example environment 100 through which an example vehicle 102 is traveling. The example vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially- or fully-autonomous.

The example vehicle 102 may be any configuration of vehicle, such as, for example, a van, a sport utility vehicle, a cross-over vehicle, a truck, a bus, an agricultural vehicle, or a construction vehicle. The vehicle 102 may be powered by one or more internal combustion engines, one or more electric motors, hydrogen power, any combination thereof, and/or any other suitable power sources. Although the example vehicle 102 has four wheels 104, the systems and methods described herein may be incorporated into vehicles having fewer or a greater number of wheels, tires, and/or tracks. In some examples, the vehicle 102 may be a bi-directional vehicle. For example, the vehicle 102 may have four-wheel steering and may operate generally with equal performance characteristics in all directions, for example, such that a first end 106 of the vehicle 102 is the front end of the vehicle 102 when travelling forward in a first direction 108, and such that the first end 106 becomes the rear end of the vehicle 102 when traveling forward in the opposite, second direction 110, as shown in FIG. 1. Similarly, a second end 112 of the vehicle 102 is the front end of the vehicle 102 when travelling forward in the second direction 110, and such that the second end 112 becomes the rear end of the vehicle 102 when traveling forward in the opposite, first direction 108. These example characteristics may facilitate greater maneuverability, for example, in small spaces or crowded environments, such as parking lots and urban areas.

The vehicle 102 may travel through the environment 100, relying at least in part on sensor data indicative of objects in the environment 100 in order to determine trajectories of the vehicle 102. For example, as the vehicle 102 travels through the environment 100, one or more sensor systems 114 capture data associated with detected objects (e.g., vehicles, pedestrians, buildings, barriers, unevenness in the surface on which the vehicle 102 travels, etc.). In some examples, the sensor systems 114 may include, for example, RGB-cameras, monochrome cameras, intensity (grey scale) cameras, infrared cameras, ultraviolet cameras, depth cameras, stereo cameras, and the like. The sensor systems 114 can also include, for example, one or more of light detection and ranging (LiDAR) sensors, radio detection and ranging (RADAR) sensors, one or more ultrasonic transducers, such as a sound navigation and ranging (SONAR) sensor, or other known sensor types. The data captured may be used, for example, as input for determining trajectories for the vehicle 102 and/or for other purposes.

As schematically depicted in FIG. 1, the vehicle 102 may travel on a surface 116, such as, for example, any road surface (e.g., asphalt, gravel, etc.). As shown in FIG. 1, the surface 116 may include areas of unevenness, such as, for example, a depression 118 (e.g., a pothole or a dip in the surface 116). Other areas of unevenness may include bumps or protrusions (e.g., a speed bump or heave in the surface 116). As also illustrated, the road surface 116 can include various road segments having different shapes. For example, the illustrated road surface includes a relatively straight section 120 and a curve 122. As the vehicle 102 travels along the road surface, various forces may be exerted on the wheels 104, which forces are transmitted through the wheel(s) 104 to a vehicle chassis 124 of the vehicle 102 via a suspension system 126 coupling the wheels 104 to the vehicle chassis 124. For instance, surface unevenness, such as from the depression 118 may cause a heave condition (e.g., vertical displacement) on the wheels 104, whereas turning the vehicle 102, e.g., to navigate the curve 122, can result in roll forces (e.g., rotational displacement about a longitudinal axis of the vehicle, which may be generally parallel to the directions 108, 110).

As shown in FIG. 1, the suspension system 126 may include a suspension control system 128 configured to control one or more components of the suspension system 126, for example, as described herein. In some examples, the suspension system 126 may be configured for association with two wheels 104 (e.g., the two wheels 104 proximate the first end 106 or the two wheels 104 proximate the second end 112 of the vehicle 102). The pair of wheels 104 may be coupled to the vehicle chassis 124 at least in part by a first strut 130*a* and a second strut 130*b*. More specifically, the first strut 130*a* may couple a first wheel 104 to the vehicle chassis 124 and the second strut 130*b* may couple a second wheel 104 to the vehicle chassis 124. In this manner, the first strut 130*a* and the second strut 130*b* allow for movement of the respective wheel 104 relative to the vehicle chassis 124. The struts 130*a*, 130*b* may be coupled to a suspension control arm (not shown in FIG. 1) coupled to the wheel 104 and the vehicle chassis 124, and extension and retraction of the struts 130*a*, 130*b* may cause the wheel 104 to respectively extend away from the vehicle chassis 124 (e.g., raising the vehicle chassis 124 relative to the surface 116 at the wheel 104) and/or to retract closer to the vehicle chassis 124 (e.g., lowering the vehicle chassis 124 relative to the surface 116 at the wheel 104). In some examples, the struts 130*a*, 130*b* may be configured as pneumatic springs, generally including a strut cylinder 132, a strut rod 134, and a strut piston 136. For example, the strut rod 134 may be coupled to the strut piston 136 and configured to extend and retract relative to the strut cylinder 132. The strut cylinder 132 and the strut piston 134 may define a strut extension chamber 138 and a strut retraction chamber 140. In the illustrated example, and as detailed further herein, the strut extension chamber 138 is configured to receive compressed air causing extension (e.g., vertical upward movement in the orientation illustrated) of the strut rod 134 relative to the strut cylinder 132. Although not illustrated, the struts 130*a*, 130*b* may also include a damping member or the like.

In some examples, the struts 130*a*, 130*b* may be configured to operate in a passive manner, such that, for example, as the strut is compressed and expanded (for example, by traversing uneven surfaces), the strut rod 134 retracts and extends as a result of force inputs exerted on the wheels 104. In such examples, the struts 130*a*, 130*b* may include one or more valves (not shown) configured to permit fluid flow, such that the strut rod 134 may reciprocate or oscillate within the strut cylinder 132, for example, to control oscillations or rebound of the strut piston 136 as it reacts to force inputs. Such actuation of the struts 130*a*, 130*b* may occur passively as the wheel 104 travels across unevenness of the surface 116, such as the depression 118 and/or a bump. Also, in some instances, such as when the vehicle 102 travels around the curve 122, compressive forces may be generated on the wheels 104 of the vehicle 102 on the inside of the curve 122, and expansive forces may act on the wheels 104 of the vehicle 102 on the outside of the curve 122. The struts 130*a*, 130*b* may react to such forces, e.g., via corresponding up and down movement of the strut pistons 136.

In the example shown in FIG. 1, the suspension system 126 also includes a first adjustment cylinder 142 and a second adjustment cylinder 144. The first adjustment cylinder 142 is located remotely from the first strut 130*a* (e.g., spaced from the first strut 130*a*) and in fluid communication with the first strut 130*a*, e.g., via a first fluid line 146, to control aspects of the first strut 130*a* as described further herein. Similarly, the second adjustment cylinder 144 is located remotely from the second strut 130*b* (e.g., spaced from the second strut 130*b*) and in fluid communication with the second strut 130*b*, e.g., via a second fluid line 148, to control aspects of the second strut 130*b*. For example, as shown in FIG. 1, the example suspension system 126 also includes a valve controller 150 configured to control opening and closing of valves associated with the first adjustment cylinder 142 and/or the second adjustment cylinder 144, e.g., to alter aspects of an anti-roll feature, as detailed further herein.

In more detail, the first adjustment cylinder 142 includes a first piston 152 separating an interior volume of the first adjustment cylinder 142 into a first volume 154 and a second volume 156. Similarly, the second adjustment cylinder 144 includes a second piston 158 separating an interior volume of the second adjustment cylinder 144 into a first volume 160 and a second volume 162. As illustrated, the first volume 154 of the first adjustment cylinder 142 is fluidly connected to the first strut 130*a* (e.g., to the expansion chamber 138 of the first strut 130*a*) by the first fluid line 146 and the first volume 160 of the second adjustment cylinder 144 is fluidly connected to the second strut 130*b* (e.g., to the expansion chamber 138 of the second strut 130*b*) by the second fluid line 148.

The first adjustment cylinder 142 also includes a first cylinder fluid line 164*a* and a second cylinder fluid line 164*b*. Both the first cylinder fluid line 164*a* and the second cylinder fluid line 164*b* provide a fluid path between the first volume 154 and the second volume 156 of the first adjustment cylinder 142. The first cylinder fluid line 164*a* includes an associated first valve 166 and an associated first one-way valve 168 (although in examples functionality of the first valve 166 and the first one-way valve 168 can be incorporated into a single valve). In the example, when the valve 166 is open, air is free to flow through the first cylinder fluid line 164*a* from the first volume 154 to the second volume 156. However, the first one-way valve 168 prohibits flow in the opposite direction, e.g., from the second volume 156 to the first volume 154. The second cylinder fluid line 164*b* has an associated second valve 170 and an associated second one-way valve 172 (although in examples functionality of the second valve 170 and the second one-way valve 172 can be incorporated into a single valve). In the example, when the second valve 170 is open, air is free to flow through the second cylinder fluid line 164*b* from the second volume 156 to the first volume 154. However, the second one-way valve 172 prohibits flow in the opposite direction, e.g., from the first volume 154 to the second volume 156. Although the first cylinder fluid line 164*a* and the second cylinder fluid line 164*b* are described as separate lines, and may be configured as completely separate lines, e.g., having different ports to access the first volume 154 and the second volume 156, in other implementations, including the illustrated implementation, the first cylinder fluid line 164*a* and the second cylinder fluid line 164*b* may be arranged as parallel lines between a single port to the first volume 154 and a single port to the second volume 154.

As also illustrated in FIG. 1, the first cylinder fluid line 164*a* and/or the second cylinder fluid line 164*b* may be connected to a pneumatic system 174, e.g., via a first inlet line 176. For example, the pneumatic system 174 may include a pressurized air source, for example, a pump and/or compressor configured to supply pressurized air and/or an air tank storing compressed air. Other sources of pressurized air are contemplated, and as used herein, "air" may include any fluid, gas or combination of gases that could serve as a pressurized fluid in a manner consistent with the operation of the struts 130*a*, 130*b* and related methods described herein.

As noted, the suspension system 126 includes the first inlet line 176 providing flow communication between the pneumatic system 174 and the first adjustment cylinder 142. In the example shown, a valve 178 is provided in the first inlet line 176. The valve 178 may be configured to open to provide flow communication between the pneumatic system 174 and the first adjustment cylinder 142 via the first inlet line 176 (and to the first strut 130*a* via the first fluid line 146). For example, compressed air from the pneumatic system 174 can charge or otherwise pressurize the first adjustment cylinder 142, as well as adjust a height of the strut piston 136 (and therefore of the strut rod 134), e.g., by pressurizing the expansion chamber 138 of the first strut 130*a*. Regarding the latter, air in excess of an amount contained in the first volume 154 and the second volume 156 will flow into the expansion chamber 138 of the first strut 130*a* via the first fluid line 146 and the strut piston 136 will move (upward) with the introduction of more compressed air. In some implementations, the pneumatic system 174 may charge or pressurize the first adjustment cylinder 142 and the first strut 130*a* once, e.g., at commencement of operation of the vehicle 102, with the first inlet valve 178 then being closed, e.g., to create a closed system. Once charged, the first adjustment cylinder 142 and the first strut 130*a* (and their fluid connections) become a closed pneumatic system, e.g., without additional compressed air being added during operation of the vehicle 102. Some examples of the suspension system 126 may include an additional valve independent of the first inlet valve 178 in the first inlet line 176 to release pressure from the first strut 130*a* and/or the first adjustment cylinder 142, e.g., at the completion of operation.

As also illustrated in FIG. 1, the second adjustment cylinder 144 includes a cylinder fluid line 180 providing fluid communication between the first volume 160 and the second volume 162 of the second adjustment cylinder 144. Also in the example, the cylinder fluid line 180 has an associated valve 182, which may be a high-volume bypass flow valve, e.g., sized to allow unrestricted flow through the cylinder fluid line 180 when open. Specifically, when the valve 182 is open, air is free to flow through the cylinder fluid line 180 from the first volume 160 to the second volume 162 or from the second volume 162 to the first volume 160, e.g., to normalize pressure in the second adjustment cylinder. Although the cylinder fluid line 180 is illustrated as a single line, in examples, the second adjustment cylinder 144 may have two or more flow lines fluidly connecting the first volume 160 and the second volume 162. For instance, the second adjustment cylinder 144 may be configured to have an arrangement similar to that associated with the first adjustment cylinder 142. By way of non-limiting example, the second adjustment cylinder can include two fluid lines, each including a one-way valve.

As also illustrated in FIG. 1, the cylinder fluid line 180 may be connected to the pneumatic system 174, e.g., via a second inlet line 184. A second inlet valve 186 is provided in the second inlet line 184. The second inlet valve 186 may be configured to open to provide flow communication between the pneumatic system 174 and the second adjustment cylinder 144 via the second inlet line 184 (and to the second strut 130*b* via the second fluid line 148). For example, compressed air from the pneumatic system 174 can charge or otherwise pressurize the second adjustment cylinder 144, as well as adjust a height of the strut piston 136 (and therefore of the strut rod 134) of the second strut 130*b*. Regarding the latter, air in excess of an amount contained in the first volume 160 and the second volume 162 will flow into the expansion chamber 138 of the second strut 130*b* via the second fluid line 148 and the strut piston 136 will move (upward) with the introduction of more compressed air. In some implementations, the pneumatic system 174 may charge or pressurize the second adjustment cylinder 144 and the second strut 130*b* once, e.g., at commencement of operation of the vehicle 102, with the second inlet valve 186 then being closed, e.g., to create a closed system. In some examples, the second adjustment cylinder 144 and the second strut 130*b* (and their fluid connections) become a closed pneumatic system, e.g., without additional compressed air being added during operation of the vehicle 102. Some examples of the suspension system 126 may include an additional valve independent of the second inlet valve 186 in the second inlet line 184 to release pressure from the second strut 130*b* and/or the second adjustment cylinder 144, e.g., at the completion of operation of the vehicle 102.

As just described, the first adjustment cylinder 142 is fluidly connected to the first strut 130*a* as a first pneumatic system (e.g., associated with a first wheel) and the second adjustment cylinder 144 is fluidly connected to the second strut 130*a* as a second pneumatic system (e.g., associated with a second wheel). However, in the illustrated example, the systems are not fluidly connected. Accordingly, in some implementations, the pneumatic system 174 may charge or pressurize the first adjustment cylinder 142 and the first strut 130*a* and charge or pressurize the second adjustment cylinder 144 and the second strut 130*b* individually, and to different pressures (and/or different ride heights) in some instances. In implementations, and regardless of the pressure in each of the systems, the pneumatic system 174 may charge (or pressurize) the first adjustment cylinder 142 and the first strut 130*a* and the second adjustment cylinder 144 and the second strut 130*b* once, e.g., at commencement of operation of the vehicle 102. Thereafter, the first and second adjustment cylinders 142, 144 and the first and second struts 130*a*, 130*b* (and their fluid connections) become a passive system, e.g., without additional compressed air being added during operation. As detailed further herein, because no additional air is required during travel, the system is passive. However, through active transfer of air within each of the two separate, closed systems, and because the systems are mechanically coupled, the resulting system provides for selective engagement and disengagement of an anti-roll feature, as well as for selective stiffening of the anti-roll feature, when engaged. Unlike conventional active suspension systems, implementations described herein can require less power to obtain desirable results.

Although separated fluidly, the first adjustment cylinder 142 and the second adjustment cylinder 144 are mechanically connected. Specifically, FIG. 1 illustrates a rod 188 connecting the first piston 152 to the second piston 158. As detailed further herein, this connection can impart similar (or the same) stiffness characteristics to both struts 130*a*, 130*b* by moving the respective pistons 152, 158 at one of the adjustment cylinders 142, 144. In FIG. 1, the rod 188 is illustrated as a piston rod axially aligned with the first piston 152 and the second piston 158. However, this arrangement is for example only. The rod 188 may be replaced with any connection, e.g., rigid mechanical connection that causes the first piston 152 and the second piston 158 to move together, as described herein.

In implementations, during operation of the vehicle 102, the valve controller(s) 150 can control opening and closing of the valves 166, 170, 182 to alter characteristics of the suspension system 126. For example, and as detailed further below, by closing all of the valves, e.g., to prevent flow between the first volume 154 and the second volume 156 of the first adjustment cylinder 142 and to prevent flow between the first volume 160 and the second volume 162 of the second adjustment cylinder 144, the adjustment cylinders 142, 144 can enable anti-roll functionality. For instance, in such a configuration, movement of the pistons 136 of the struts 130*a*, 130*b* is restricted. More specifically, the strut piston 136 of the first strut 130*a* is acted on by a pressure of air in the expansion chamber 138 (of the first strut 130*a*), the first flow line 146, and the first volume 154 of the first adjustment cylinder 142. Similarly, the strut piston 136 of the second strut 130*b* is acted on by a pressure of air in the expansion chamber 138 (or the second strut 130*b*), the second fluid line 148, and the first volume 160 of the second adjustment cylinder 144. Thus, movement of the strut pistons is regulated by these pressures. Moreover, the arrangement couples movement of the two struts. Consider an example in which the strut piston 136 associated with the first strut 130*a* experiences a force that causes the piston 136 to compress the expansion chamber 138. Such compression may cause the first piston 152 of the first adjustment cylinder to move from left to right, which will cause a corresponding movement of the second piston 158 from left to right. This movement of the second piston 158 results in an expansion (e.g., pressure decrease) of the first volume 160 and therefore of the expansion chamber 138 of the second strut 130*b*. This resulting pressure drop will cause the strut piston 136 of the second strut 130*b* to move downward, e.g., an amount corresponding to the downward movement of the strut piston 136 of the first strut 130*a*.

Coupling of the first strut 130*a* and the second strut 130*b* in the manner just described can provide benefits in instances in which the vehicle experiences roll-type events, e.g., while cornering. For example, because each of the pair of wheels 104 experiences a different force, e.g., one compressive, one expansive, the coupling achieved by closing the valves 166, 170, 182 can normalize the forces, reducing an impact on the vehicle 102. Examples herein also can adjust a stiffness of this anti-roll feature. Specifically, by controlling fluid to flow from the first volume 154 to the second volume 156, e.g. via the first one-way valve 168, the first volume 154 can be decreased. Moreover, because of the rigid connection between the first piston 152 and the second piston 158, the first volume 160 of the second adjustment cylinder 144 also can be reduced. Reductions of the first volumes 154, 160 will provide a relatively stiffer anti-roll feature, e.g., because the combined volume of the expansion chamber and the associated first volume 154, 160 is lower. Conversely, by controlling fluid to flow from the second volume 156 to the first volume 154, e.g., via the second one-way valve 170, the first volume 154 can be increased. And, because of the rigid connection of the first piston 152 to the second piston 158, the first volume 160 of the second adjustment cylinder 144 also can be increased (e.g., expanded). Expansion of the first volumes 154, 160 will provide a relatively looser anti-roll feature, e.g., because the combined volume of the respective expansion chamber 138 and the associated first volume 154, 160 is higher.

In contrast to the roll events just described, the anti-roll functionality may be less desirable in other implementations. For instance, and because of the operational principles just described, when only a single wheel experiences a heave condition, e.g., as the vehicle drives over the depression 118, the coupling of the first and second struts 130*a*, 130*b* can result in heaving at both struts, which can be uncomfortable for passengers and/or otherwise undesirable. Accordingly, in implementations, the valve controller(s) 150 can selectively disengage the anti-roll functionality. For example, the valve controller(s) 150 can open the valves 166, 170, 182, e.g., all of the valves 166, 170, 182. Opening all of the valves in this manner may result in the respective first and second adjustment cylinders 142, 144 being effectively decoupled, e.g., because the pistons 154, 158 will be free to reach equilibrium independently. In this example, the pistons 154, 158 are still physically coupled, but the free flow of air between the first volume 154 and the second volume 156 and the free flow of air between the first volume 160 and the second volume 162 will greatly reduce the impact of movement at one strut on the other strut, compared to the configuration in which all valves are closed. In other examples, the valve controller(s) 150 may only open the valve 182, e.g., to allow for freer movement of the pistons 154, 158, but which may allow the pistons 154, 158 to their pre-disengagement position, e.g., by maintaining the pressurization in the first adjustment cylinder 142, as described herein. Additional details of disengaging the anti-roll functionality are detailed further below with reference to FIG. 5.

In at least some examples, the suspension system 126 can also include a damper 190, illustrated as a cylinder. For example, the damper 190 may comprise a semi-active damper, and may be embodied as a hydraulic cylinder, for example. As also illustrated in FIG. 1, the damper 190 can include a damper fluid line 192 and a valve 194 controlling flow in the damper fluid line 192. For example, the valve 194 may be a variable flow valve configured to adjust a volume on either side of a damper piston 196. As illustrated, the damper piston can be connected to the first piston 152, e.g., by a damper rod 198. In some examples, the valve 194 can be controlled, e.g., by the valve controller(s) 150, to inhibit horizontal movement of the pistons 152, 158 and the rod 188. By way of non-limiting example, the valve 194 can be closed to effectively lock the pistons 152, 158 in a horizontal position, such as the position illustrated. In some examples, such locking may be beneficial in a potential crash or similar event, including when the vehicle 102 is controlled to brake suddenly. In other examples, the valve controller(s) 150 may be used to control the damper valve 194 to alter characteristics of the suspension system 126 relative to reduce pitching of the vehicle, e.g., when going over a bump or uneven road surface. As noted above, the damper 190 may be optional.

Figure 2:
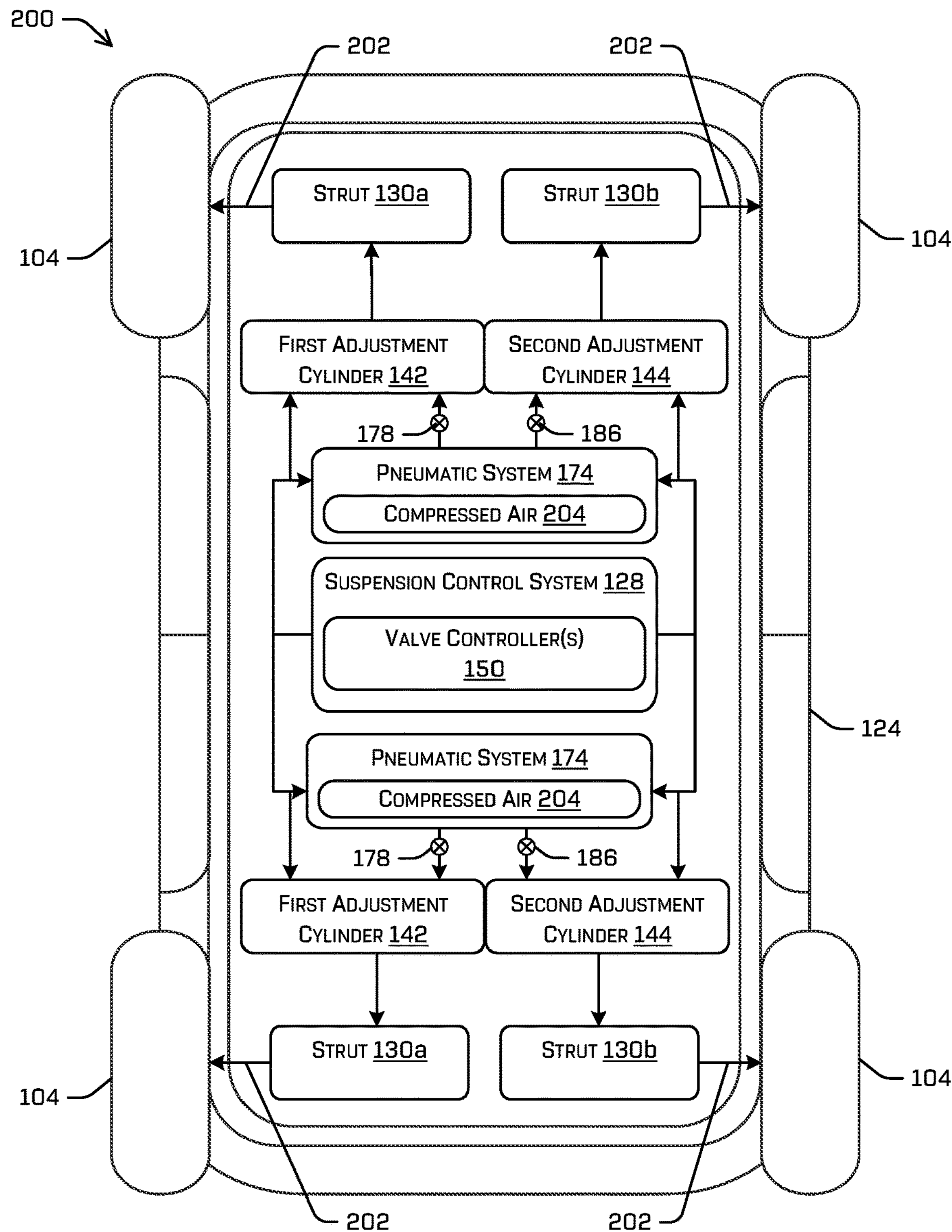
FIG. 2 is a schematic top view of an example vehicle including an example suspension system, according to implementations described herein.

FIG. 2 is a schematic top view of an example vehicle 200, which may correspond to the example vehicle 102 shown in FIG. 1. The example vehicle 200 may include the example suspension system 126 shown in FIG. 2. The example vehicle 200 includes four wheels 104 located generally at four respective corners of the vehicle chassis 124. Each of the wheels 104 may be coupled to the vehicle chassis 124 via a respective strut 130*a*, 130*b*. For example, the struts 130*a*, 130*b* may be coupled to a respective wheel 104 via suspension control arms 202 schematically depicted in FIG. 2. As explained herein, in some examples, one or more (e.g., each) of the struts 130*a*, 130*b* may include a pneumatic spring coupled to respective control arms 202, and the pneumatic springs may be charged, e.g., by the pneumatic system 174, to establish a ride height of the vehicle 200 at the respective wheels 104 by moving the strut pistons 136, for example, as described herein. In some examples, the suspension system 126 may be configured to permit two or four of the wheels 104 to pivot to create steering angles for maneuvering the vehicle 200.

As shown in FIG. 2, the example vehicle 200 also includes the suspension control system 128 including, in some examples, the valve controller(s) 150 configured to control the stiffness of the suspension system 126 of the vehicle 200, for example, as described herein. The example vehicle 200 also includes the pneumatic system 174 (shown as two pneumatic systems 174 although more or fewer may be included) including a source of compressed air 204 (e.g., a pump, compressor, and/or a tank of compressed air), which may be used to pressurize or charge the adjustment cylinders 142, 144 and the struts 130*a*, 130*b* of the vehicle 200, for example, as described herein.

As shown in FIG. 2, the suspension system 126 may include the input valves 178, 186 to control flow communication between the source(s) of compressed air 204 of the pneumatic system(s) 174 and the adjustment cylinders 142, 144 and the struts 130*a*, 130*b*. The valves 178, 186 may be configured to open to provide flow communication to the respective struts 130*a*, 130*b*, to close to prevent flow communication to the respective struts 130*a*, 130*b*, and in some examples, to release pressure from the respective struts 130*a*, 130*b*. Some examples of the suspension system 126 may include one or more additional valves independent from the valves 178, 186 to release pressure from the respective pneumatic springs. Also in examples, the vehicle 200 can include one or more sensors, which may be configured to generate respective signals indicative of the pressure in the respective pneumatic springs struts 130*a*, 130*b* and/or the adjustment cylinders 142, 144, which may be used as described herein.

As detailed herein, the valve controller(s) 150 may be configured to adjust a stiffness of the suspension system 126. In some examples, the valve controller(s) 150 may be configured to receive one or more signals generated by one or more components of the vehicle, e.g., a sensor system (which may include the sensor systems 114), a perception system, a planning system, or the like, and based at least in part on those signals, the valve controller(s) 150 may be configured to cause the suspension system 126 to operate one or more of the valves 166, 170, 182 to adjust the pressure differential in the adjustment cylinders 142, 144 to change the suspension stiffness, as described herein. For example, the valve controller(s) 150 may be configured to stiffen the suspension, e.g., by decreasing the first volume 154 of the first adjustment cylinder 142 and the first volume 160 of the second adjustment cylinder 144 in response to an anticipated curve in the road and/or the vehicle exceeding a threshold speed (e.g., 25 mph). In other examples, the valve controller(s) 150 may be configured to loosen the suspension, e.g., by increasing the first volume 154 of the first adjustment cylinder 142 and the first volume 160 of the second adjustment cylinder 144. For instance, the looser suspension may be desirable for wheels that are the leading wheels, whereas the suspension system 126 associated with the trailing wheels may have a relatively stiffer suspension. Also in examples, the valve controller(s) 150 may be configured to disengage the pneumatic suspension, e.g., by opening the valves 166, 170, 182 to allow air to flow freely therethrough. For instance, disengaging the suspension may provide improved performance when the wheels 104 traverse over uneven terrain. More specifically, a relatively stiffer suspension may not perform as well in heave conditions, when compared to free oscillation of the strut piston 136.

Figure 3:
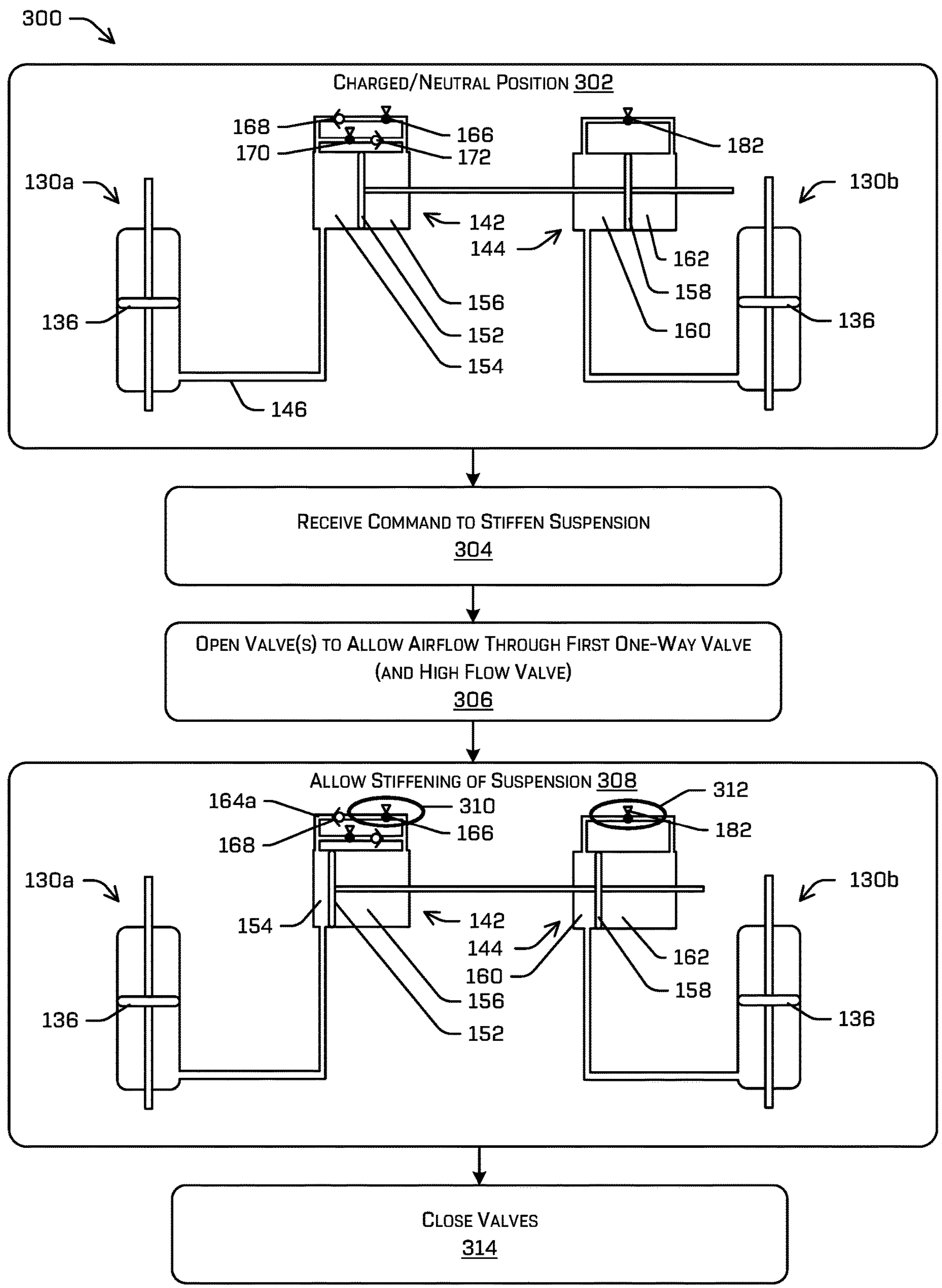
FIG. 3 is a textual and visual flow diagram of an example sequence for stiffening a suspension system, according to examples described herein.

FIG. 3 includes textual and visual flowcharts illustrating an example process 300 for adjusting a stiffness of a pneumatic suspension system, e.g., to provide an anti-roll feature. In examples described herein, the techniques associated with the process 300 may be performed by components of the suspension system 126, including the valve controllers 150. However, the process 300 is not limited to being performed by the suspension system 126, and the suspension system 126 may perform processes in addition to or different from the process 300.

A schematic 302 illustrates aspects of a suspension system, which may be the suspension system 126, in a charged/neutral position. More specifically, the schematic 302 illustrates an arrangement in which the first adjustment cylinder 142 and the first strut 130*a* have been charged, e.g., pressurized, for instance by the source of compressed air 204 illustrated in FIG. 2. In addition, the second adjustment cylinder 144 and the second strut 130*b* have also been charged. In the example, the first piston 152 and the second piston 158 are generally centered in the respective cylinders, e.g., such that the first volume 154 of the first adjustment cylinder 142 and the second volume 156 of the first adjustment cylinder 142 are substantially equal, and the first volume 160 of the second adjustment cylinder 144 and the second volume 162 of the second adjustment cylinder 144 are substantially equal. Moreover, the struts 130*a*, 130*b* are pressurized such that the strut pistons 136 are at a predetermined height, e.g., a ride height for the chassis of the vehicle. In examples, the adjustment cylinders 142, 144 and the struts 130*a*, 130*b* may be pressurized to the arrangement shown in the schematic 302 when a vehicle having the pneumatic suspension system is readied for operation. In other examples, the suspension may be configured as in the arrangement shown in the schematic 302 in response to the vehicle exceeding a threshold speed.

At operation 304, the process 300 can include receiving a command to stiffen the suspension. For example, one or more sensors on the vehicle including the suspension system may receive a signal indicative of a speed of the vehicle exceeding a threshold speed. By way of nonlimiting example, it may be desirable to have a stiffer suspension at speeds equal to or above about 25 miles per hour. However, other speeds may also be used as thresholds for stiffening a suspension. Also in examples, the command to stiffen the suspension received at the operation 304 may be in response to a determination that the vehicle will be navigating one or more curves. For instance, the command may be a signal indicating that steering angle of the vehicle meets or exceeds a threshold angle. In examples, stiffer suspensions may better counteract forces applied as vehicles corner around curves or the like, as described herein. Also in examples, the command to stiffen the suspension may be in response to the vehicle changing direction. For instance, it may be desirable to have a relatively stiffer suspension on leading wheels and relatively softer suspension on trailing wheels. Thus, when the vehicle is a bi-directional vehicle, it may be beneficial to adjust a suspension stiffness in response to travel in an opposite direction of previous travel.

At operation 306, the process 300 can include opening one or more valves to allow air flow through the first one-way valve (and the high flow valve). For example, in examples described herein, the first adjustment cylinder 142 may include the first and second cylinder fluid lines 164*a*, 164*b*, each including a valve 166, 170 and a one-way valve 168, 172, respectively. At the operation 306, the first valve 166 may be opened, e.g., to allow fluid to flow from the first volume 154 to the second volume 156 via the first cylinder fluid line 164*a*. (flow from the second volume 156 to the first volume 154 is restricted, e.g., by closing (or keeping closed) the second valve 172). As the fluid fills up the second volume 156, the piston 152 may move from right-to-left. Also at the operation 306, the valve 182 can be opened, e.g., to allow the piston 158 to move freely with the piston 152. In some examples, opening of the valve 182 may be delayed for some amount of time after the first valve 166 is opened, e.g. to allow some pressure to build in the second volume 156.

A schematic 308 illustrates the stiffening of the suspension. More specifically, a section 310 highlights the first valve 166 that is opened at the operation 306, e.g., to allow fluid to flow through the one-way valve 168. A section 312 also highlights the valve 182 that may also be opened to allow the pistons 152, 158 to move from right-to-left as also shown in the schematic 308. In this example, the first volumes 154, 160 are reduced and the second volumes 156, 162 are increased.

At operation 314, the process 300 can include closing the valves. For example, the valve controller(s) 150 may close the first valve 166 and the valve 182 to maintain the pistons 152, 158 in the positions illustrated in the schematic 308. In some examples, because the first volumes 154, 160 are relatively smaller, vertical movement of the strut pistons 136 is restricted, e.g., relative to the neutral position shown in the schematic 302. Such a configuration may counteract forces occurring from navigating corners or the like. For instance, the first adjustment cylinder 142 and the second adjustment cylinder 144 in the configuration shown in the schematic 308 may provide an anti-roll function through the use of pneumatics.

Figure 4:
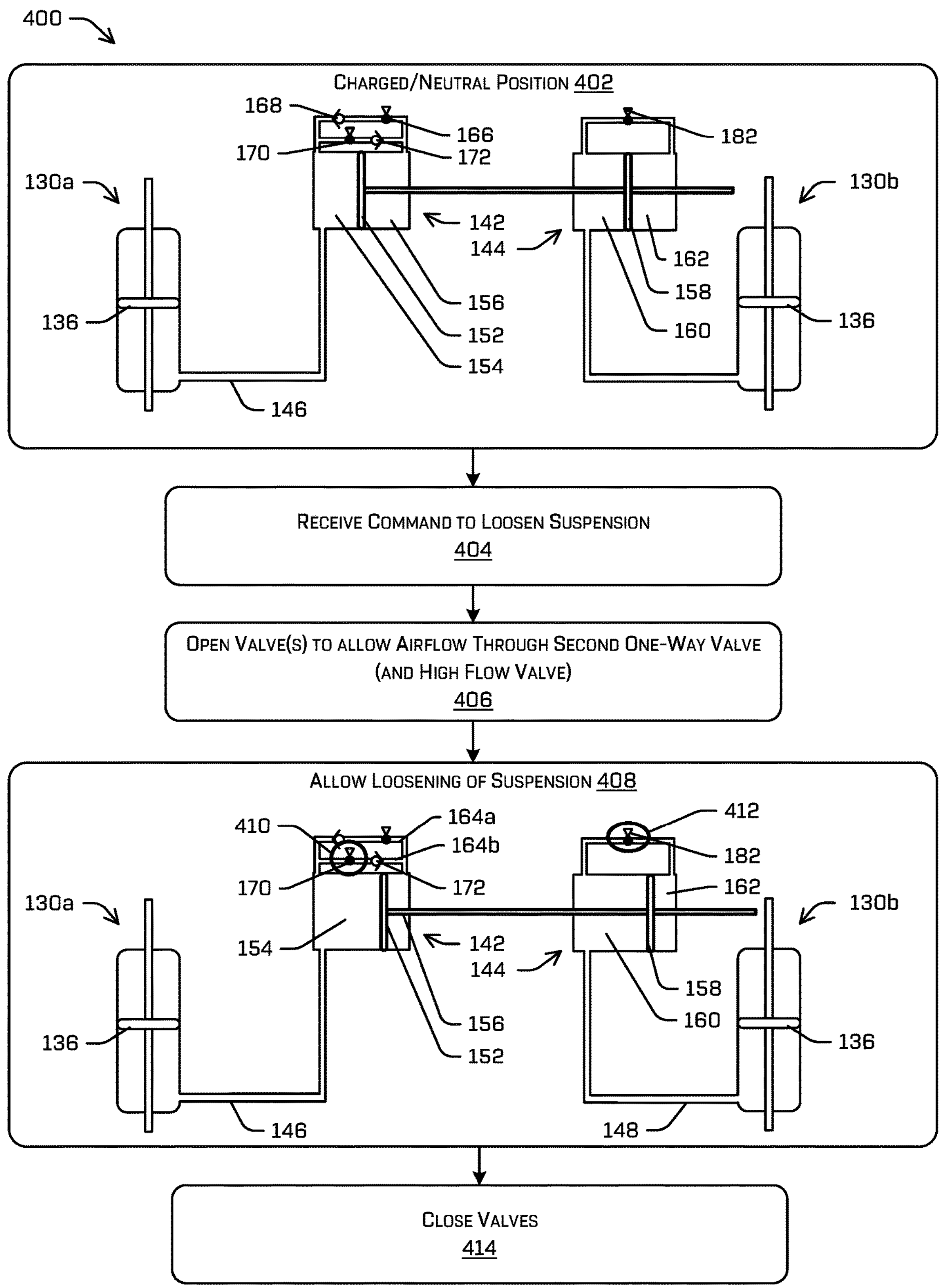
FIG. 4 is a textual and visual flow diagram of an example sequence for loosening a suspension system, according to examples described herein.

FIG. 4 includes textual and visual flowcharts illustrating an example process 400 for adjusting a stiffness of a pneumatic suspension system, e.g., to provide an anti-roll feature having a different stiffness than achieved using the process 300. In examples described herein, the techniques associated with the process 400 may be performed by components of the suspension system 126, including the valve controllers 150. However, the process 400 is not limited to being performed by the suspension system 126, and the suspension system 126 may perform processes in addition to or different from the process 400.

A schematic 402 illustrates aspects of a suspension system, which may be the suspension system 126, in a charged/neutral position. The schematic 402 is substantially identical to the schematic 302, although in other examples it could also be substantially identical to the schematic 308. More specifically, the schematic 402 illustrates an arrangement in which the first adjustment cylinder 142 and the first strut 130*a* have been charged, e.g., pressurized, for instance by the source of compressed air 204 illustrated in FIG. 2. The second adjustment cylinder 144 and the second strut 130*b* have also been charged. In the example, the first piston 152 and the second piston 158 are generally centered in the respective cylinders, e.g., such that the first volume 154 of the first adjustment cylinder 142 and the second volume 156 of the first adjustment cylinder 142 are substantially equal, and the first volume 160 of the second adjustment cylinder 144 and the second volume 162 of the second adjustment cylinder 144 are substantially equal. Moreover, the struts 130*a*, 130*b* are pressurized such that the strut pistons 136 are at a predetermined height, e.g., a ride height for the chassis of the vehicle. In examples, the adjustment cylinders 142, 144 and the struts 130*a*, 130*b* may be pressurized to the arrangement shown in the schematic 402 when a vehicle having the pneumatic suspension system is readied for operation. In other examples, the suspension may be configured as in the arrangement shown in the schematic 402 in response to the vehicle exceeding a threshold speed.

At operation 404, the process 400 can include receiving a command to loosen the suspension. For example, one or more sensors on the vehicle including the suspension system may transmit a signal indicative of a speed of the vehicle exceeding a threshold speed. By way of nonlimiting example, it may be desirable to enable the anti-roll functionality at speeds equal to or above about 25 miles per hour. However, other speeds may also be used as thresholds for stiffening a suspension. Also in examples, the command to stiffen the suspension received at the operation 404 may be in response to a determination that the vehicle will be navigating one or more curves. In examples, stiffening the suspension according to examples described herein may better counteract forces applied as vehicles corner around curves or the like. Also in examples, the command to stiffen the suspension may be in response to the vehicle changing direction. For instance, it may be desirable to have a relatively stiffer suspension on leading wheels and relatively softer suspension on trailing wheels. Thus, when the vehicle is a bi-directional vehicle, it may be beneficial to adjust a suspension stiffness in response to travel in an opposite direction of previous travel. In the example of the process 400, then, the command received at the operation 404 can indicate that the wheels associated with the suspension system will be the trailing wheels.

At operation 406, the process 400 can include opening one or more valves to allow air flow through the second one-way valve (and the high flow valve). For example, in examples described herein, the first adjustment cylinder 142 may include the first and second cylinder fluid lines 164*a*, 164*b*, each including a valve 166, 170 and a one-way valve 168, 172, respectively. At the operation 406, the second valve 170 may be opened, e.g., to allow fluid to flow from the second volume 156 to the first volume 154, e.g., through the second cylinder fluid line 164*b*. During this operation, the first valve 166 may be retained in a closed position. As the fluid fills up the first volume 154, the piston 152 may move from left-to-right. Also at the operation 406, the valve 182 can be opened, e.g., to allow the piston 158 to move freely with the piston 152. In some examples, opening of the valve 182 can be delayed relative to the opening of the second valve 170, e.g., to allow pressure to build in the first volume 154.

A schematic 408 illustrates the loosening of the suspension. More specifically, a section 410 highlights the second valve 170 that is opened at the operation 408, e.g., to allow fluid to flow through the second one-way valve 172. A section 412 also highlights the valve 182 that may also be opened to allow the pistons 152, 158 to move from left-to-right as also shown in the schematic 408. In this example, the first volumes 154, 160 are increased and the second volumes 156, 162 are decreased.

At operation 414, the process 400 can include closing the valves. For example, the valve controller(s) 150 may close the second valve 166 and the valve 182 to maintain the pistons 152, 158 in the positions illustrated in the schematic 408. In some examples, because the first volumes 154, 160 are relatively larger, greater vertical movement of the strut pistons 136 may be allowed, e.g., relative to the neutral position shown in the schematic 402. Such a configuration may counteract forces occurring from navigating corners or the like, but perhaps not as effectively as in the process 300. For instance, the first adjustment cylinder 142 and the second adjustment cylinder 144 in the configuration shown in the schematic 408 may provide an anti-roll function through the use of pneumatics, but that is less stiff that in the configuration shown in the schematic 308. In one non-limiting example, leading wheels of a vehicle may have the configuration illustrated in the schematic 308 whereas trailing wheels of the vehicle may have the configuration illustrated in the schematic 408.

Figure 5:
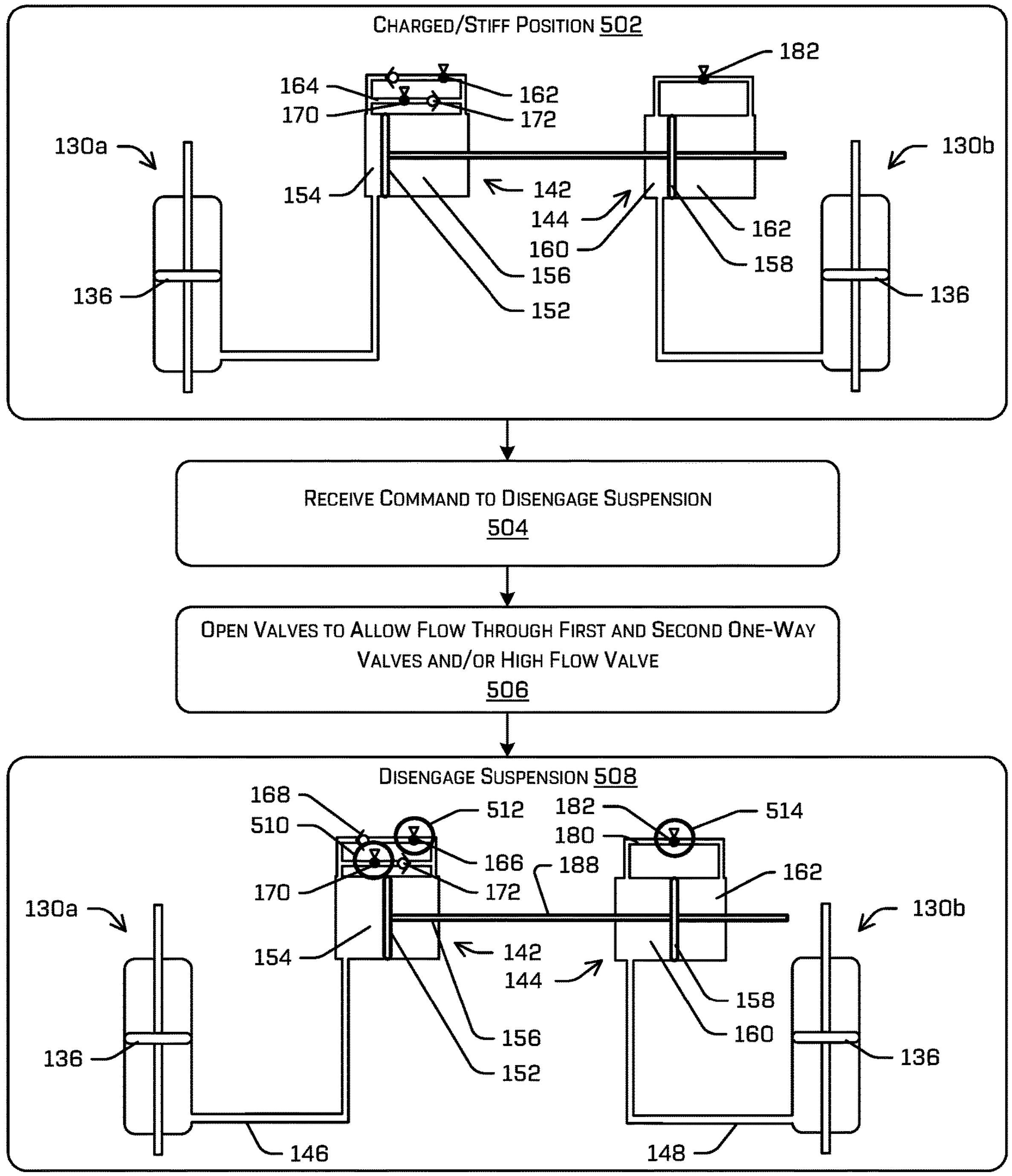
FIG. 5 is a textual and visual flow diagram of an example sequence for stiffening a suspension system, according to implementations described herein.

FIG. 5 includes textual and visual flowcharts illustrating an example process 500 for disengaging a pneumatic anti-roll feature, such as the features engaged using the process 300 and/or the process 400. In examples described herein, the techniques associated with the process 500 may be performed by components of the suspension system 126, including the valve controllers 150. However, the process 500 is not limited to being performed by the suspension system 126, and the suspension system 126 may perform processes in addition to or different from the process 500.

A schematic 502 illustrates aspects of a suspension system, which may be the suspension system 126, in a charged/stiff position, e.g., in which an anti-roll feature is engaged. The schematic 502 is substantially identical to the schematic 308, although in other examples it could also be substantially identical to the schematic 302, the schematic 402, and/or the schematic 408. More specifically, the schematic 502 illustrates an arrangement in which the first adjustment cylinder 142 and the first strut 130*a* have been charged, e.g., pressurized, for instance by the source of compressed air 204 illustrated in FIG. 2. The second adjustment cylinder 144 and the second strut 130*b* have also been charged. In the example, the first piston 152 and the second piston 158 are generally left-of-center in the respective cylinders, e.g., such that the first volume 154 of the first adjustment cylinder 142 is less than the second volume 156 of the first adjustment cylinder 142, and the first volume 160 of the second adjustment cylinder 144 is less than the second volume 162 of the second adjustment cylinder 144. Moreover, the struts 130*a*, 130*b* are pressurized such that the strut pistons 136 are at a predetermined height, e.g., a ride height for the chassis of the vehicle. In examples, the adjustment cylinders 142, 144 and the struts 130*a*, 130*b* may be pressurized to the arrangement shown in the schematic 502 when a vehicle having the pneumatic suspension system is readied for operation. In other examples, the suspension may be configured as in the arrangement shown in the schematic 502 in response to the vehicle exceeding a threshold speed, or otherwise.

At operation 504, the process 500 can include receiving a command to disengage the suspension coupling. For example, one or more sensors on the vehicle including the suspension system may transmit a signal indicative of the vehicle speed being less than a threshold speed. By way of nonlimiting example, it may be desirable to disable the anti-roll functionality at speeds equal to or less than about 25 miles per hour. However, other speeds may also be used as thresholds for stiffening a suspension. Also in examples, the command to disengage the suspension received at the operation 504 may be in response to a determination that the vehicle will be navigating an uneven road surface. In examples, the first and second adjustment cylinders 142, 144 may provide improved performance in roll-type situations, but may cause diminished performance in heave-type scenarios and/or in scenarios in which two paired wheels are experiencing uneven forces, e.g., from uneven road surfaces. Accordingly, the process 500 can include functionality to selectively disengage the pneumatic anti-roll function.

At operation 506, the process 500 can include opening one or more valves to allow air flow through the first and second one-way valves and/or the high flow bypass valve. For example, in examples described herein, the first adjustment cylinder 142 may include the first and second cylinder fluid lines 164*a*, 164*b*, each including a valve 166, 170 and a one-way valve 168, 172, respectively. At the operation 506, the first valve 166 and the second valve 170 may be opened, e.g., to allow fluid to flow freely between the first volume 154 and the second volume 156, e.g., through the first and second cylinder fluid lines 164*a*, 164*b*. Also at the operation 506, the valve 182 can be opened, e.g., to allow for free flow of air through the fluid line 180.

A schematic 508 illustrates the disengagement of the anti-roll feature. More specifically, a section 510 highlights the second valve 170 and a section 512 highlights the first valve 166 that are opened at the operation 508, e.g., to allow fluid to flow freely through the first and second one-way valves 168, 172. A section 514 also highlights the valve 182 that is opened. In this example, the first volumes 154, 160 and the second volumes 156, 162 may not inhibit movement of the strut pistons 136, e.g., as an associated wheel heaves due to an outside force, such as an uneven road surface.

As will be appreciated, when the valves 166, 170, 182 are open, the first and second adjustment cylinders 142, 144 may not impede motion of the strut pistons 136. For instance, coupling the struts 130*a*, 130*b* using the example suspension system can adversely affect a response of the suspension system to certain terrain, including uneven terrain. Stated differently, the anti-roll functionality resulting from the first and second adjustment cylinders can exacerbate a response of the suspension system to heave-causing terrain. In some instances, the disengagement of the suspension may be achieved by opening only the valve 182. For example, once the valve 182 is open, the second piston 158 may be free to oscillate in response to forces at the second strut 130*b*. This oscillation may be transferred to the first piston 152, e.g., via the rod 188. Such an arrangement may provide additional benefits relative to arrangements in which the valves 166, 170 are opened along with the valve 182. For example, when it is desirable to re-engage the anti-roll functionality, e.g., by closing the valve 182, the pistons 152, 158 will return to the positions immediately before the opening of the valve 182. That is, because the relative pressures in the first adjustment cylinder 142 are unchanged (because the valves associated with that cylinder are closed), the system will revert back to the pre-disengaged state. In at least some examples, the anti-roll functionality can be disengaged at relatively low speeds (e.g., below 15 mph) and/or when uneven roads are detected.

Figure 6:
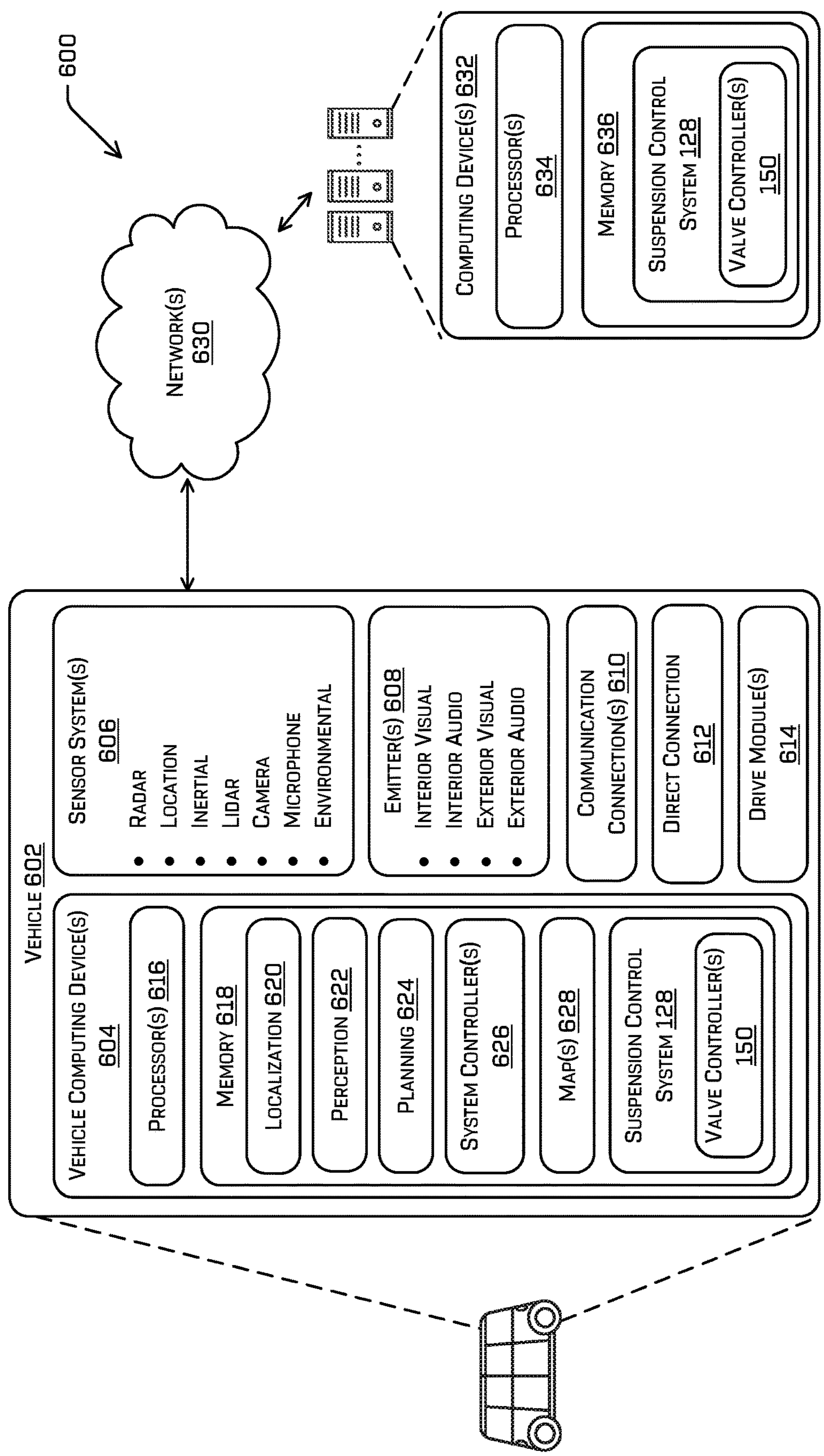
FIG. 6 is a block diagram of an example system for implementing the suspension system and related techniques described herein.

FIG. 6 depicts a block diagram of an example system 600 for implementing the techniques described herein. In at least some examples, the system 600 may include a vehicle 602, which may correspond to the example vehicle 102 shown in FIG. 1. The vehicle 602 may include a vehicle computing device 604, one or more sensor systems 606, one or more emitters 608, one or more communication connections 610, at least one direct connection 612, and one or more drive modules 614.

The vehicle computing device 604 may include one or more processors 616 and memory 618 communicatively coupled with the one or more processors 616. In the illustrated example, the vehicle 602 is an autonomous vehicle. However, the vehicle 602 may be any other type of vehicle. In the illustrated example, the memory 618 of the vehicle computing device 604 stores a localization component 620, a perception component 622, a planning component 624, one or more system controllers 626, one or more maps 628, and an example suspension control system 128, including one or more example valve controllers 150. Though depicted in FIG. 6 as residing in memory 618 for illustrative purposes, it is contemplated that the localization component 620, the perception component 622, the planning component 624, the one or more system controllers 626, the one or more maps 628, and the suspension control system 128 may additionally, or alternatively, be accessible to the vehicle 602 (e.g., stored on, or otherwise accessible by, memory remote from the vehicle 602).

In at least one example, the localization component 620 may be configured to receive data from the sensor system(s) 606 to determine a position and/or orientation of the vehicle 602 (e.g., one or more of an x-, y-, z-position, roll, pitch, or yaw). In some examples, such a position/orientation may be determined relative to a map, described below, such that a ride height for each wheel may be determined. For example, the localization component 620 may include and/or request/receive a map of an environment and may continuously determine a location and/or orientation of the autonomous vehicle within the map. In some examples, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 620 may provide data to various components of the vehicle 602 to determine an initial position of an autonomous vehicle for generating a candidate trajectory, as discussed herein.

In some examples, the perception component 622 may be configured to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 622 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc. Moreover, in aspects of this disclosure, the perception component 622 can identify road unevenness, e.g., dips, bumps, speed bumps, or the like.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

The system controller(s) 626, may be configured to control steering, propulsion, braking, safety, emitters, communication, and other systems of the vehicle 602. These system controller(s) 626 may communicate with and/or control corresponding systems of the drive module(s) 614 and/or other components of the vehicle 602.

The map(s) 628 that may be used by the vehicle 602 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 628 may include at least one map (e.g., images and/or a mesh). In some example, the vehicle 602 may be controlled based at least in part on the maps 628. That is, the maps 628 may be used in connection with the localization component 620, the perception component 622, and/or the planning component 624 to determine a location of the vehicle 602, identify objects in an environment, and/or generate routes and/or trajectories to navigate within an environment. Also in examples, the map(s) 628 may be used by the suspension control system 128 to identify curves, e.g., to engage the anti-roll functionality described herein in anticipation of navigating such curves. In some instances, the map(s) 628 can identify roads or road segments having a radius equal to or above a threshold radius, which roads/segments may be identified as road surface for which the anti-roll functionality should be engaged.

In some examples, the one or more maps 628 may be stored on a remote computing device(s) (such as the computing device(s) 632) accessible via network(s) 630. In some examples, multiple maps 628 may be stored based on, for example, a characteristic (e.g., type of entity, time of day, day of week, season of the year, etc.). Storing multiple maps 628 may have similar memory requirements but may increase the speed at which data in a map may be accessed. In at least some examples, such maps may have stored information regarding surface conditions (including friction, unevenness, potholes, and the like).

As shown in FIG. 6, in some examples, the suspension control system 128 may be stored in the memory 618 of the computing device 604 of the vehicle 602 or remote from the vehicle 602 in the memory 636 of the computing device(s) 632. In some examples, some portions of the suspension control system 128 may be stored in the memory 618 of the computing device 604 of the vehicle 602, and other portions of suspension control system 128 may be stored remotely in the memory 636 of the computing device(s) 632, and the separately located portions of the suspension control system 128 may operate together in a coordinated manner.

The suspension control system 128 (and the valve controller(s) 150) are detailed above in connection with FIG. 1. Generally, the suspension control system 128 (including the valve controller(s) 150) may include functionality to selectively engage or disengage pneumatic anti-roll functionality. Moreover, the suspension control system 128 can adjust a stiffness of the anti-roll feature, e.g., as detailed in connection with FIGS. 3 and 4. In any such example, the suspension control system 128 may utilize data from any one or more of the maps (e.g., map data regarding upcoming terrain, potholes, etc.) and/or trajectories generated by the planning component 624 (e.g., speeds, rate of curvature, steering angles, and the like) to alter one or more characteristics of the suspension system as detailed herein.

In some examples, aspects of some or all of the components discussed herein may include any models, algorithms, and/or machine learning algorithms. For example, in some examples, the components in the memory 618 and/or the memory 636 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 606 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 606 may include multiple examples of each of these or other types of sensors. For example, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or alternatively, the sensor system(s) 606 may send sensor data, via the one or more networks 630, to the one or more computing device(s) at a particular frequency, after a lapse of a predetermined period of time, in near real-time, etc.

The emitter(s) 608 can be configured to emit light and/or sound. The emitter(s) 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The communication connection(s) 610 can enable communication between the vehicle 602 and one or more other local or remote computing device(s). For example, the communication connection(s) 610 may facilitate communication with other local computing device(s) on the vehicle 602 and/or the drive module(s) 614. Also, the communication connection(s) 610 may allow the vehicle 602 to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 630. For example, the communications connection(s) 610 may enable Wi-Fi-based communication, such as via frequencies defined by the IEEE 802.11 standards, short range wireless frequencies such as Bluetooth®, cellular communication (e.g., 6G, 3G, 4G, 4G LTE, 5G, etc.) or any suitable wired or wireless communications protocol that enables the respective computing device to interface with the other computing device(s).

In at least one example, the direct connection 612 may provide a physical interface to couple the drive module(s) 614 with the body of the vehicle 602. For example, the direct connection 612 may allow the transfer of energy, fluids, air, data, etc. between the drive module(s) 614 and the vehicle 602. In some examples, the direct connection 612 may further releasably secure the drive module(s) 614 to the body of the vehicle 602.

The vehicle 602 may also include the drive module(s) 614. In some examples, the vehicle 602 may have a single drive module 614. In at least one example, if the vehicle 602 has multiple drive modules 614, individual drive modules 614 may be positioned on opposite ends of the vehicle 602 (e.g., the front and the rear, etc.). In at least one example, the drive module(s) 614 may include one or more sensor systems to detect conditions of the drive module(s) 614 and/or the surroundings of the vehicle 602. By way of example and not limitation, the sensor system(s) 606 may include one or more wheel encoders (e.g., rotary encoders) to sense rotation of the wheels (e.g., wheels 104 in FIG. 1) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 614. In some cases, the sensor system(s) on the drive module(s) 614 may overlap or supplement corresponding systems of the vehicle 602 (e.g., sensor system(s) 606).

The drive module(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system, such as the suspension system 126, including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 may include a drive module controller, which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 614. Furthermore, the drive module(s) 614 also include one or more communication connection(s) that enable communication by the respective drive module with one or more other local or remote computing device(s).

In at least one example, the localization component 620, perception component 622, the planning component 624, and/or the suspension control system 128 may process sensor data, as described above, and may send their respective outputs, over the one or more network(s) 630, to one or more computing device(s) 632. In at least one example, the localization component 620, the perception component 622, the planning component 624, and/or the suspension control system 12 may send their respective outputs to the one or more computing device(s) 632 at a particular frequency, after a lapse of a predetermined period of time, in near real-time, etc.

The processor(s) 616 of the vehicle 602 and/or the processor(s) 634 of the computing device(s) 632 may be any suitable processor capable of executing instructions to process data and perform operations as described herein. By way of example and not limitation, the processor(s) 616 and 634 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 636 are examples of non-transitory computer-readable media. The memory 618 and 636 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 632, and/or components of the computing device(s) 632 may be associated with the vehicle 602. That is, the vehicle 602 may perform one or more of the functions associated with the computing device(s) 632, and vice versa.

Figure 7:
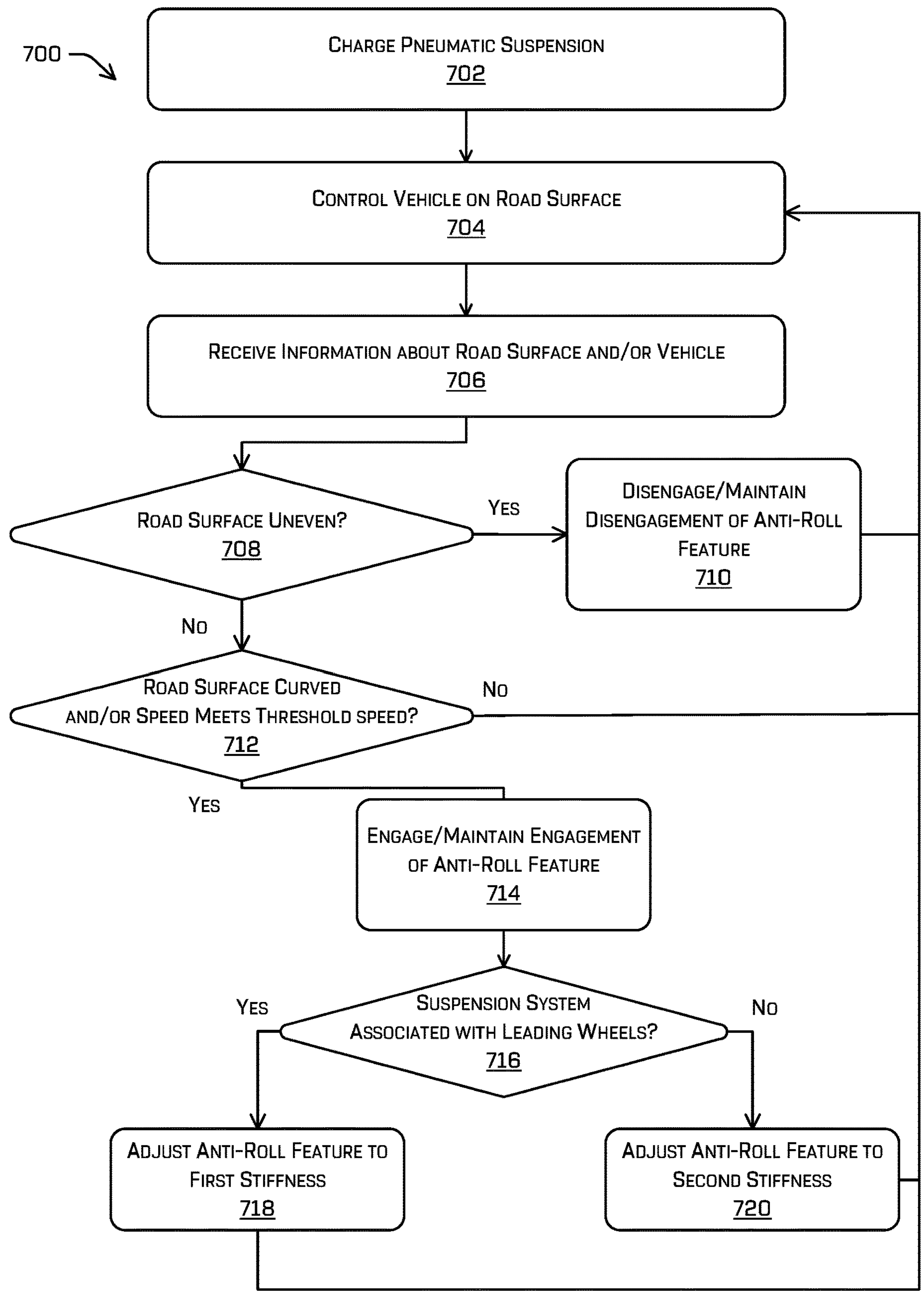
FIG. 7 is a flow diagram of an example process for adjusting a suspension of an example vehicle, according to examples described herein.

FIG. 7 is a flow diagram of an example process illustrated as a collection of blocks in a logical flow graph. Such blocks (as well as blocks used to illustrate the processes 300, 400, 500, above) represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an example process 800 for controlling aspects of a pneumatic suspension system.

At operation 702, the example process 700 may include charging a pneumatic suspension. In some examples, a vehicle may be one of the vehicles 102, 200, and may include the suspension system 126, generally including the first and second struts 130*a*, 130*b* and the first and second adjustment cylinders 142, 144. The suspension system 126 may be charged, e.g., by the pneumatic system 174, to fill the first and second adjustment cylinders 142, 144 and to establish a position of the strut pistons 136. The position of the strut pistons 136 may define a ride height for the vehicle. Once charged, the suspension system 126 can include two separate, closed pneumatic systems, e.g., a first including the first adjustment cylinder 142 and the first strut 130*a* and a second including the second adjustment cylinder 144 and the second strut 130*b*. Although pneumatically separate, the two systems may be physically coupled, e.g., via the rod 188.

At operation 704, the process can include controlling the vehicle on a road surface. For example, the vehicle may be an autonomous vehicle, and may be one of the vehicles 102, 200. In such examples, the vehicle may autonomously drive over the road surface to a destination.

At operation 706, the process 700 can include receiving information about the road surface and/or the vehicle. For example, information about the road surface can be determined from sensor data captured by sensor systems associated with the vehicle. In other examples, the information about the road surface can be determined from map data, such as from the map(s) 628. The information about the road surface can be information about any aspect of the road surface that could impact movement of the vehicle on the road surface, including aspects of the road surface that could cause a variance in one or more forces acting on wheels of the vehicle. Information about the vehicle can include information about a speed of the vehicle, information about a steering angle associated with the vehicle, and/or other information associated with travel of the vehicle on the road surface.

At operation 708, the process 700 can determine whether the road surface is uneven. For instance, a suspension system controller can receive one or more signals, e.g., from a sensor system, a perception system, or other system, indicating that a road includes depressions, protrusions, grooves, and/or other features that cause unevenness in the road surface.

If, at the operation 708, it is determined that the road surface is uneven, at operation 710 the process 700 can include disengaging an anti-roll feature, if such a feature is not already disengaged. For example, and as detailed herein, the anti-roll feature may be disengaged by opening one or more valves associated with one or both of the adjustment cylinders 142, 144, e.g., to allow free fluid flow. Effectively, disengaging the anti-roll feature in this manner will allow the struts 130*a*, 130*b* to absorb forces exerted on the wheels by the uneven road without any (or with little) resistance from the adjustment cylinders 142, 144. After disengaging the anti-roll feature at the operation 710, the process 700 can return to the operation 704, e.g., with the anti-roll feature disengaged.

Alternatively, if at the operation 708 it is determined that the road surface is not uneven, at operation 712, the process 700 can include determining whether the road surface is curved and/or whether a speed of the vehicle meets or exceeds a threshold speed. For instance, the information received at the operation 706 can be used to determine such information.

If, at the operation 712 it is determined that the road surface is not curved and the speed does not meet (e.g., is below) a threshold speed, the process 700 can return to the operation 704, e.g., without any change to the suspension system.

Alternatively, if at the operation 712 it is determined that road surface is curved and/or the vehicle is travelling at or exceeding a threshold speed, at operation 714 the process 700 engages an anti-roll feature, if the feature isn't already engaged. In examples, engaging the anti-roll feature can include closing all valves associated with the adjustment cylinders 142, 144, e.g., to limit travel of the strut pistons 136, as described herein.

At operation 716, the process 700 can optionally include determining whether a suspension system is associated with leading wheels. In examples described herein, a suspension system can provide a physical coupling between aspects (e.g., a first adjustment cylinder 142) fluidly connected to a first strut associated with a first wheel at an end of a vehicle and aspects (e.g., a second adjustment cylinder 144) fluidly connected to a second strut associated with a second wheel also arranged at the end of the vehicle. The operation 716 can determine whether the end is the leading end or the trailing end, e.g. based on a current direction of travel, a calculated route or trajectory, or the like.

If, at the operation 716 it is determined that the suspension system is associated with the leading end of the vehicle, at operation 718 the process 700 can adjust the anti-roll feature to a first stiffness. For example, the suspension system can be adjusted according to the process 300, e.g., to reduce the first volumes of the adjustment cylinders 142, 144 in fluid communication with the struts 130*a*, 130*b*, to achieve a relatively high stiffness.

Alternatively, if, at the operation 716 it is determined that the suspension system is associated with a trailing end of the vehicle, at operation 720 the process 700 can adjust the anti-roll feature to a second stiffness. For example, the suspension system can be adjusted according to the process 400, e.g., to increase the first volumes of the adjustment cylinders 142, 144 in fluid communication with the struts 130*a*, 130*b*, to achieve a lower stiffness than with the suspension system associated with the leading wheels. As a result of the relatively lower stiffness, the struts associated with the rear of the vehicle may oscillate further than the struts associated with the front of the vehicle. Such an arrangement can cause an improved rider experience, and with improved safety outcomes resulting from the anti-roll functionality.

The systems, components, and methods described herein are for example only; modifications and alterations are contemplated. By way of non-limiting example, although the configuration illustrated in FIG. 1 includes the first and second adjustment cylinders 142, 144, other components can be used to impart similar functionality. By way of non-limiting example, one or more of the first volumes 154, 160 and the second volumes 156, 162 can be embodied as any compressible and expandable) structure defining a volume, including but not limited to air bladders, bellows, or the like. In examples in which bladders or baffles are used, for example, the pistons 152, 158 and/or the piston rod 188 can be replaced with a movable structure, such as a plate disposed between the bladders/baffles. Any arrangement that allows for regulation of pressure between connected volumes and relative movement of rigid structures acted on by the volumes can be used.

References herein to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular implementations, "connected" may be used to indicate that two or more elements are in direct physical or fluid contact with each other. "Coupled" may mean that two or more elements are in direct physical or fluid contact. However, "coupled" may also mean that two or more elements are not in direct contact with each other, but yet still co-operate or interact with each other.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and components are disclosed as exemplary forms of implementing the claims.

Example Clauses

A: An example vehicle includes: a chassis; a first wheel; a first strut coupled to the first wheel and the chassis; a second wheel; a second strut coupled to the second wheel and the chassis; and a pneumatic suspension system comprising: a first cylinder; a first piston disposed in the first cylinder and movable along an axis of the first cylinder, the first piston sectioning an interior volume of the first cylinder into a first volume and a second volume, the first strut being in fluid communication with the first volume; a second cylinder; a second piston disposed in the second cylinder and movable along an axis of the second cylinder, the second piston sectioning an interior volume of the second cylinder into a third volume and a fourth volume, the second strut being in fluid communication with the third volume; and a piston rod connecting the first piston to the second piston.

B: The vehicle of example A, further comprising: at least one first conduit fluidly connecting the first volume and the second volume; at least one first valve controlling flow in the at least one first conduit; a second conduit fluidly connecting the third volume and the fourth volume; and a second valve controlling flow in the second conduit.

C: The vehicle of example A or example B, further comprising a suspension control system configured to: receive information about a road surface condition or a speed of the vehicle; and control one or more of the at least one first flow control valve or the second flow control valve based at least in part on the road surface condition or the speed of the vehicle.

D: The vehicle of any one of example A through example C, wherein: the information about the road surface condition comprises an uneven road surface condition; and the suspension control system is configured to control the one or more of the at least one first valve or the second valve to one or more of allow flow between the first volume and the second volume or allow flow between the third volume and the fourth volume.

E: The vehicle of any one of example A through example D, wherein: the information about the speed of the vehicle comprises information that the speed of the vehicle meets or exceeds a threshold speed; and the suspension control system is configured to control the one or more of the at least one first valve or the second valve to cause air to flow from at least one of the first volume to the second volume or the third volume to the fourth volume to cause the first piston to reduce the first volume and the second piston to reduce the third volume.

F: An example suspension system includes: a first volume containing compressed air and fluidly connected to a first strut associated with a first wheel of a vehicle; a second volume fluidly connected to the first volume; a first moveable member disposed between the first volume and the second volume; a third volume containing compressed air and fluidly connected to a second strut associated with a second wheel of the vehicle; a fourth volume fluidly connected to the third volume; and a second moveable member disposed between the third volume and the fourth volume, the second moveable member being mechanically coupled to the first moveable member.

G: The suspension system of example F, further comprising: at least one first conduit fluidly connecting the first volume to the second volume; at least one first valve configured to control fluid flow through the at least one first conduit; a second conduit fluidly connecting the third volume to the fourth volume; and a second valve configured to control fluid flow through the second conduit.

H: The suspension system of example F or example G, wherein: the at least one first conduit comprises a first fluid line and a second fluid line fluidly connecting the first volume to the second volume; the at least one first valve includes a first flow valve and a first one-way valve associated with the first fluid line; and the at least one second valve includes a second flow valve and a second one-way valve associated with the second fluid line, the suspension system further comprising: a suspension control system configured to: open the first flow valve to allow compressed air to flow from first volume to the second volume via the first one-way valve; or open the second flow valve to allow compressed air to flow from the second volume to the first volume via the second one-way valve.

I: The suspension system of any one of example F through example H, further comprising: a suspension control system configured to: receive information about at least one of a road condition or a vehicle condition; and control, based at least in part on the information, one or more of the at least one first valves or the second valve.

J: The suspension system of any one of example F through example I, wherein: the information about the road surface condition comprises an uneven road surface condition; and the suspension control system is configured to open one or more of the at least one first valve or the second valve to one or more of allow flow between the first volume and the second volume or allow flow between the third volume and the fourth volume.

K: The suspension system of any one of example F through example J, wherein: the information about the vehicle condition comprises information that the speed of the vehicle meets or exceeds a threshold speed or the road condition information comprises information that the road surface has one or more curves; and the suspension control system is configured to close the at least one of the first valve and the second valve.

L: The suspension system of any one of example F through example K, wherein the suspension control system is further configured to: receive information about a direction of travel of the vehicle; and based at least in part on the suspension system being associated with a leading end of the vehicle, cause air to flow at least one of from the first volume to the second volume or from the third volume to the fourth volume to cause the first moveable member to reduce the first volume and the second moveable member to reduce the third volume; or based at least in part on the suspension system being associated with a trailing end of the vehicle, cause air to flow at least one of the from the second volume to the first volume or from the fourth volume to the third volume to cause the first movable member to reduce the second volume and the second movable member to reduce the fourth volume.

M: The suspension system of any one of example F through example L, wherein: the first volume and the second volume are volumes in a first cylinder and the first moveable member is a first piston; and the third volume and the fourth volume are volumes in a second cylinder and the second moveable member is a second piston coupled to the first piston.

N: The suspension system of any one of example F through example M further comprising a damper connected to the first moveable member or the second moveable member.

O: The suspension system of any one of example F through example N, wherein the first volume, the second volume, and the first strut form a first closed pneumatic system and the third volume, the fourth volume, and the second strut form a second closed pneumatic system.

P: An example method of controlling a suspension system, the suspension system including: a first cylinder; a first piston disposed in the first cylinder and movable along an axis of the first cylinder, the first piston sectioning an interior volume of the first cylinder into a first volume and a second volume, the first strut being in fluid communication with the first volume; a first conduit fluidly connecting the first volume and the second volume; a first valve associated with the first conduit; a second cylinder; a second piston disposed in the second cylinder and movable along an axis of the second cylinder, the second piston sectioning an interior volume of the second cylinder into a third volume and a fourth volume, the second strut being in fluid communication with the third volume; a second conduit fluidly connecting the third volume to the fourth volume; and a second valve associated with the second conduit; a piston rod connecting the first piston to the second piston, the method comprising: receiving information about a road surface or a vehicle condition; and controlling at least one of the first valve or the second valve based at least in part on the road surface or the vehicle condition.

Q: The method of example P, wherein: the information about the road surface condition comprises an uneven road surface condition; and the controlling comprises opening one or more of the at least one of the first valve or the second valve to one or more of allow flow between the first volume and the second volume or allow flow between the third volume and the fourth volume.

R: The method of example P or example Q, wherein: the information about the vehicle condition comprises information that the speed of the vehicle meets or exceeds a threshold speed or the road condition information comprises information that the road surface has one or more curves; and the controlling comprises closing the at least one of the first valve and the second valve.

S: The method of any one of example P through example R, further comprising: determining a direction of travel of the vehicle, wherein the controlling comprises, based at least in part on the suspension system being associated with a leading end of the vehicle, causing air to flow at least one of from the first volume to the second volume or from the third volume to the fourth volume to cause the first moveable member to reduce the first volume and the second moveable member to reduce the third volume.

T: The method of any one of example P through example S, further comprising: determining a direction of travel of the vehicle, wherein the controlling comprises, based at least in part on the suspension system being associated with a trailing end of the vehicle, causing air to flow at least one of the from the second volume to the first volume or from the fourth volume to the third volume to cause the first movable member to reduce the second volume and the second movable member to reduce the fourth volume.

What is claimed is:

1. A vehicle comprising:

a chassis;

a first wheel;

a first strut coupled to the first wheel and the chassis;

a second wheel;

a second strut coupled to the second wheel and the chassis; and a pneumatic suspension system comprising:

a first cylinder;

a first piston disposed in the first cylinder and movable along an axis of the first cylinder, the first piston sectioning an interior volume of the first cylinder into a first volume and a second volume, the first strut being in fluid communication with the first volume;

a second cylinder;

a second piston disposed in the second cylinder and movable along an axis of the second cylinder, the second piston sectioning an interior volume of the second cylinder into a third volume and a fourth volume, the second strut being in fluid communication with the third volume; and a piston rod connecting the first piston to the second piston, wherein the first volume, the second volume, and the first strut form a first closed pneumatic system and the third volume, the fourth volume, and the second strut form a second closed pneumatic system.

2. The vehicle of claim 1, further comprising:

at least one first conduit fluidly connecting the first volume and the second volume;

at least one first valve controlling flow in the at least one first conduit;

a second conduit fluidly connecting the third volume and the fourth volume; and a second valve controlling flow in the second conduit.

3. The vehicle of claim 2, further comprising a suspension control system configured to:

receive information about a road surface condition or a speed of the vehicle; and control one or more of the at least one first flow control valve or the second flow control valve based at least in part on the road surface condition or the speed of the vehicle.

4. The vehicle of claim 3, wherein:

the information about the road surface condition comprises an uneven road surface condition; and the suspension control system is configured to control the one or more of the at least one first valve or the second valve to one or more of allow flow between the first volume and the second volume or allow flow between the third volume and the fourth volume.

5. The vehicle of claim 3, wherein:

the information about the speed of the vehicle comprises information that the speed of the vehicle meets or exceeds a threshold speed; and the suspension control system is configured to control the one or more of the at least one first valve or the second valve to close the at least one first valve or the second valve.

6. A suspension system comprising:

a first volume containing compressed air and fluidly connected to a first strut associated with a first wheel of a vehicle;

a second volume fluidly connected to the first volume;

a first moveable member disposed between the first volume and the second volume;

a third volume containing compressed air and fluidly connected to a second strut associated with a second wheel of the vehicle;

a fourth volume fluidly connected to the third volume; and a second moveable member disposed between the third volume and the fourth volume, the second moveable member being mechanically coupled to the first moveable member, wherein the first volume, the second volume, and the first strut form a first closed pneumatic system and the third volume, the fourth volume, and the second strut form a second closed pneumatic system.

7. The suspension system of claim 6, further comprising:

at least one first conduit fluidly connecting the first volume to the second volume;

at least one first valve configured to control fluid flow through the at least one first conduit;

a second conduit fluidly connecting the third volume to the fourth volume; and a second valve configured to control fluid flow through the second conduit.

8. The suspension system of claim 7, wherein:

the at least one first conduit comprises a first fluid line and a second fluid line fluidly connecting the first volume to the second volume;

the at least one first valve includes a first flow valve and a first one-way valve associated with the first fluid line; and the at least one second valve includes a second flow valve and a second one-way valve associated with the second fluid line, the suspension system further comprising:

a suspension control system configured to:

open the first flow valve to allow compressed air to flow from first volume to the second volume via the first one-way valve; or open the second flow valve to allow compressed air to flow from the second volume to the first volume via the second one-way valve.

9. The suspension system of claim 7, further comprising:

a suspension control system configured to:

receive information about at least one of a road condition or a vehicle condition; and control, based at least in part on the information, one or more of the at least one first valves or the second valve.

10. The suspension system of claim 9, wherein:

the information about the road surface condition comprises an uneven road surface condition; and the suspension control system is configured to open one or more of the at least one first valve or the second valve to one or more of allow flow between the first volume and the second volume or allow flow between the third volume and the fourth volume.

11. The suspension system of claim 9, wherein:

the information about the vehicle condition comprises information that the speed of the vehicle meets or exceeds a threshold speed or the road condition information comprises information that the road surface has one or more curves; and the suspension control system is configured to close the at least one of the first valve and the second valve.

12. The suspension system of claim 11, wherein the suspension control system is further configured to:

receive information about a direction of travel of the vehicle; and based at least in part on the suspension system being associated with a leading end of the vehicle, cause air to flow at least one of from the first volume to the second volume or from the third volume to the fourth volume to cause the first moveable member to reduce the first volume and the second moveable member to reduce the third volume; or based at least in part on the suspension system being associated with a trailing end of the vehicle, cause air to flow at least one of the from the second volume to the first volume or from the fourth volume to the third volume to cause the first movable member to reduce the second volume and the second movable member to reduce the fourth volume.

13. The suspension system of claim 6, wherein:

the first volume and the second volume are volumes in a first cylinder and the first moveable member is a first piston; and the third volume and the fourth volume are volumes in a second cylinder and the second moveable member is a second piston coupled to the first piston.

14. The suspension system of claim 6 further comprising a damper connected to the first moveable member or the second moveable member.

15. A method of controlling a suspension system, the suspension system including:

a first cylinder;

a first piston disposed in the first cylinder and movable along an axis of the first cylinder, the first piston sectioning an interior volume of the first cylinder into a first volume and a second volume, the first strut being in fluid communication with the first volume;

a first conduit fluidly connecting the first volume and the second volume, wherein the first volume, the second volume, and the first strut form a first closed pneumatic system;

a first valve associated with the first conduit;

a second cylinder;

a second piston disposed in the second cylinder and movable along an axis of the second cylinder, the second piston sectioning an interior volume of the second cylinder into a third volume and a fourth volume, the second strut being in fluid communication with the third volume;

a second conduit fluidly connecting the third volume to the fourth volume, wherein the third volume, the fourth volume, and the second strut form a second closed pneumatic system;

a second valve associated with the second conduit; and a piston rod connecting the first piston to the second piston, the method comprising:

receiving information about a road surface or a vehicle condition; and controlling at least one of the first valve or the second valve based at least in part on the road surface or the vehicle condition.

16. The method of claim 15, wherein:

the information about the road surface condition comprises an uneven road surface condition; and the controlling comprises opening one or more of the at least one of the first valve or the second valve to one or more of allow flow between the first volume and the second volume or allow flow between the third volume and the fourth volume.

17. The method of claim 15, wherein:

the information about the vehicle condition comprises information that the speed of the vehicle meets or exceeds a threshold speed or the road condition information comprises information that the road surface has one or more curves; and the controlling comprises closing the at least one of the first valve and the second valve.

18. The method of claim 15, further comprising:

determining a direction of travel of the vehicle, wherein the controlling comprises, based at least in part on the suspension system being associated with a leading end of the vehicle, causing air to flow at least one of from the first volume to the second volume or from the third volume to the fourth volume to cause the first moveable member to reduce the first volume and the second moveable member to reduce the third volume.

19. The method of claim 15, further comprising:

determining a direction of travel of the vehicle, wherein the controlling comprises, based at least in part on the suspension system being associated with a trailing end of the vehicle, causing air to flow at least one of the from the second volume to the first volume or from the fourth volume to the third volume to cause the first movable member to reduce the second volume and the second movable member to reduce the fourth volume.

* * * * *